US012613900B2

(12) United States Patent
Goshen et al.

(10) Patent No.: US 12,613,900 B2
(45) Date of Patent: Apr. 28, 2026

(54) DOCUMENT SUMMARIZER

(71) Applicant: AI21 LABS, Tel Aviv (IL)

(72) Inventors: Ori Goshen, Tel Aviv (IL); Yoav Shoham, Tel Aviv (IL); Guy Einy, Tel Aviv (IL); Or Dagan, Tel Aviv (IL); Barak Lenz, Tel Aviv (IL); Yoni Osin, Tel Aviv (IL); Yuval Peleg Levy, Tel Aviv (IL); Oren Dean, Tel-Mond (IL); Yoel Zeldes, Jerusalem (IL); Julie Fadlon, Tel Aviv (IL); Danielle Merfeld, Tel Aviv (IL)

(73) Assignee: AI21 LABS, Tel Aviv (IL)

( * ) Notice: Subject to any disclaimer, the term of this patent is extended or adjusted under 35 U.S.C. 154(b) by 0 days.

(21) Appl. No.: 18/919,126

(22) Filed: Oct. 17, 2024

(65) Prior Publication Data

US 2025/0036675 A1     Jan. 30, 2025

Related U.S. Application Data

(63) Continuation of application No. PCT/US2023/020647, filed on May 2, 2023.
(Continued)

(51) Int. Cl.
| | |
|---|---|
| *G06F 16/34* | (2025.01) |
| *G06F 40/166* | (2020.01) |

(Continued)

(52) U.S. Cl.
CPC .......... *G06F 16/345* (2019.01); *G06F 40/166* (2020.01); *G06F 40/205* (2020.01); *G06F 40/30* (2020.01); *G11B 27/34* (2013.01)

(58) Field of Classification Search
None
See application file for complete search history.

(56) References Cited

U.S. PATENT DOCUMENTS

| | | | | |
|---|---|---|---|---|
| 10,198,436 B1 * | 2/2019 | Dockhorn | ............. | G06F 40/106 |
| 10,621,237 B1 * | 4/2020 | Rathnavelu | ........... | G06F 16/332 |

(Continued)

FOREIGN PATENT DOCUMENTS

| | | |
|---|---|---|
| WO | 2022015730 A1 | 1/2022 |

OTHER PUBLICATIONS

M. W. U. Zaman, A. R. Khan and U. Rashid, "Towards Summarization of Aggregated Multimedia Verticals Web Search Results," 2023 18th International Conference on Emerging Technologies (ICET), Peshawar, Pakistan, 2023, pp. 263-268. (Year: 2023).*

(Continued)

*Primary Examiner* — Frank D Mills
(74) *Attorney, Agent, or Firm* — Finnegan, Henderson, Farabow, Garrett & Dunner LLP

(57) ABSTRACT

The presently disclosed embodiments may include a computer readable medium including instructions that when executed by one or more processing devices cause the one or more processing devices to: receive an identification of at least one source text document; load text of the at least one source text document; segment the text of the at least one source text document into two or more segments, generate, based on the analysis, at least one summary snippet associated with one or more portions of the text of the at least one source text document; and cause the at least one summary snippet to be shown on a display.

20 Claims, 14 Drawing Sheets

Related U.S. Application Data

(60) Provisional application No. 63/337,323, filed on May 2, 2022.

(51) Int. Cl.

| | |
|---|---|
| *G06F 40/205* | (2020.01) |
| *G06F 40/30* | (2020.01) |
| *G11B 27/34* | (2006.01) |

(56) References Cited

U.S. PATENT DOCUMENTS

| | | | | |
|---|---|---|---|---|
| 10,783,192 | B1 * | 9/2020 | Soubbotin | G06F 16/2428 |
| 11,226,720 | B1 * | 1/2022 | Vandivere | G06N 3/0464 |
| 11,651,039 | B1 * | 5/2023 | Soubbotin | G06F 16/93 |
| | | | | 707/706 |
| 12,094,231 | B1 * | 9/2024 | Buban | G06V 10/82 |
| 2003/0212545 | A1 | 11/2003 | Kallulli | |
| 2016/0292145 | A1 | 10/2016 | Azzi et al. | |
| 2019/0147849 | A1 | 5/2019 | Talwar et al. | |
| 2020/0019602 | A1 * | 1/2020 | Tsu | G06F 16/382 |
| 2021/0117617 | A1 | 4/2021 | Blaya | |
| 2021/0192126 | A1 | 6/2021 | Gehrmann et al. | |
| 2022/0300544 | A1 * | 9/2022 | Potter | G06N 3/088 |
| 2024/0249068 | A1 * | 7/2024 | Aldred | G06F 16/345 |

OTHER PUBLICATIONS

International Search Report and Written Opinion issued for Application No. PCT/US2023/020647 dated Sep. 7, 2023 (15 pages).

European Search Report issued in Application No. 23799904.0-1207/4519786 PCT/US2023020647, dated Jan. 19, 2026 (9 pages).

Su Ming-Hsiang et al.: "A Two-Stage Transformer-Based Approach for Variable-Length Abstractive Summarization", ARXIV: 1806. 04885V2, vol. 28, Jul. 2, 2020 (Jul. 2, 2020), pp. 2061-2072, XP011801434, DOI:10.1109/TASLP.2020.3006731.

* cited by examiner

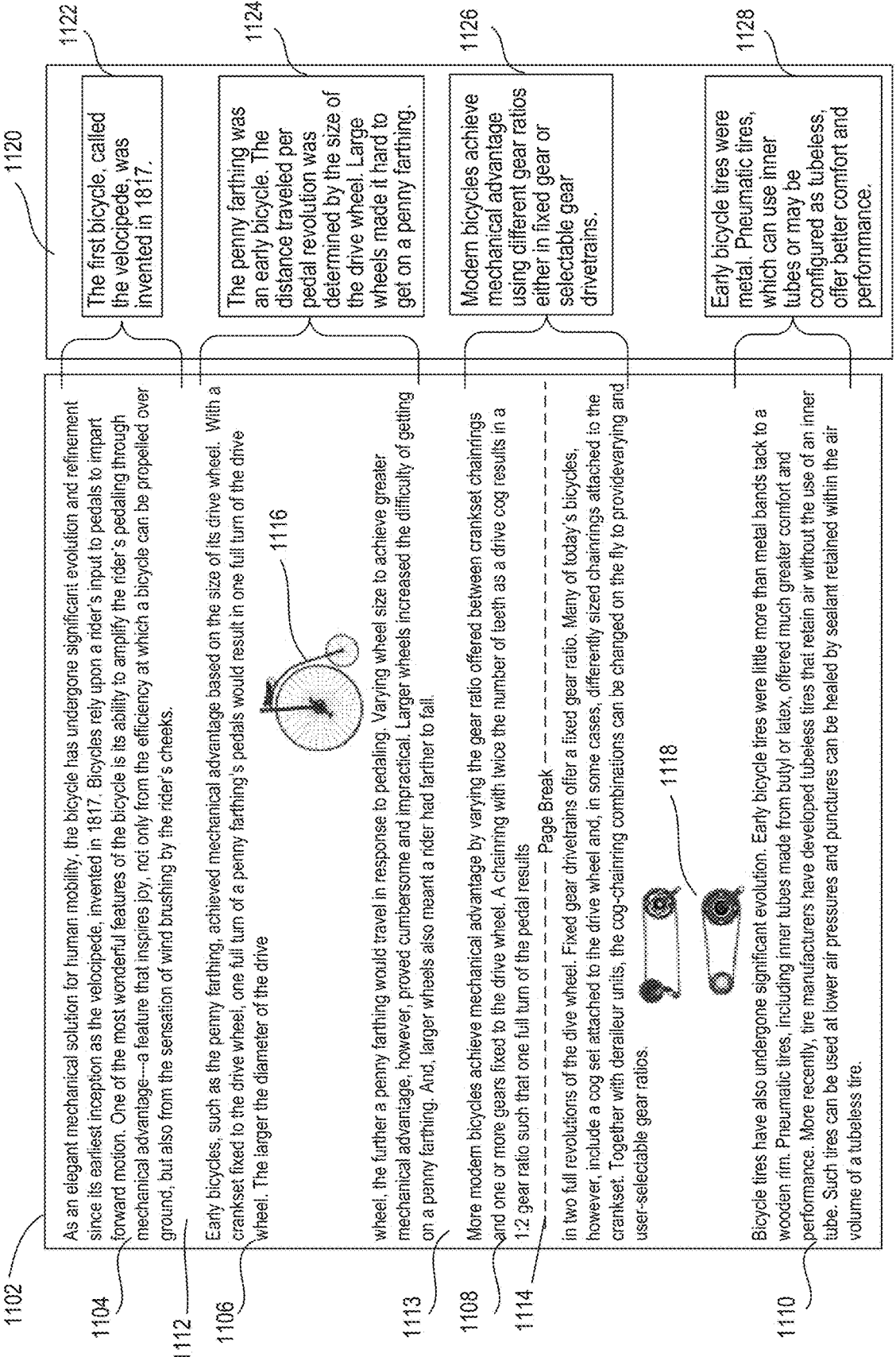

1120

1122 The first bicycle, called the velocipede, was invented in 1817.

1124 The penny farthing was an early bicycle. The distance traveled per pedal revolution was determined by the size of the drive wheel. Large wheels made it hard to get on a penny farthing.

1126 Modern bicycles achieve mechanical advantage using different gear ratios either in fixed gear or selectable gear drivetrains.

1128 Early bicycle tires were metal. Pneumatic tires, which can use inner tubes or may be configured as tubeless, offer better comfort and performance.

1102

1104 As an elegant mechanical solution for human mobility, the bicycle has undergone significant evolution and refinement since its earliest inception as the velocipede, invented in 1817. Bicycles rely upon a rider's input to pedals to impart forward motion. One of the most wonderful features of the bicycle is its ability to amplify the rider's pedaling through mechanical advantage—a feature that inspires joy, not only from the efficiency at which a bicycle can be propelled over ground, but also from the sensation of wind brushing by the rider's cheeks.

1106 Early bicycles, such as the penny farthing, achieved mechanical advantage based on the size of its drive wheel. With a crankset fixed to the drive wheel, one full turn of a penny farthing's pedals would result in one full turn of the drive wheel. The larger the diameter of the drive

1112

1116

1113 wheel, the further a penny farthing would travel in response to pedaling. Varying wheel size to achieve greater mechanical advantage, however, proved cumbersome and impractical. Larger wheels increased the difficulty of getting on a penny farthing. And, larger wheels also meant a rider had farther to fall.

1108 More modern bicycles achieve mechanical advantage by varying the gear ratio offered between crankset chainrings and one or more gears fixed to the drive wheel. A chainring with twice the number of teeth as a drive cog results in a 1:2 gear ratio such that one full turn of the pedal results 1114 ------ Page Break ------ in two full revolutions of the drive wheel. Fixed gear drivetrains offer a fixed gear ratio. Many of today's bicycles, however, include a cog set attached to the drive wheel and, in some cases, differently sized chainrings attached to the crankset. Together with derailleur units, the cog-chainring combinations can be changed on the fly to provide varying and user-selectable gear ratios.

1118

1110 Bicycle tires have also undergone significant evolution. Early bicycle tires were little more than metal bands tack to a wooden rim. Pneumatic tires, including inner tubes made from butyl or latex, offered much greater comfort and performance. More recently, tire manufacturers have developed tubeless tires that retain air without the use of an inner tube. Such tires can be used at lower air pressures and punctures can be healed by sealant retained within the air volume of a tubeless tire.

FIG. 11

< ◼ Why humans run the world | Yuval Noa... — 1410

☍   ⤓   [New]   Write   ⬦Upgrade ◖◗

Semantic search — 1450

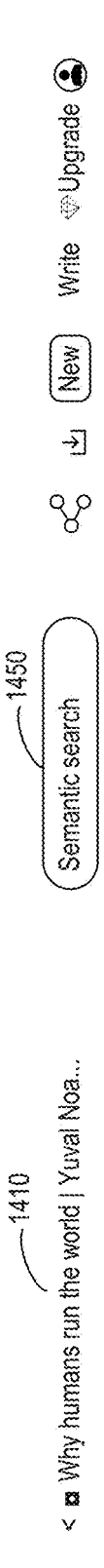

1430

Summary — 1432    Notes — 1440

Video Summary — 1431

- Seventy-thousand years ago, our ancestors were insignificant animals. Today, we are the rulers of planet Earth.

- We want to believe that we are superior to other animals, but we are actually embarrassingly similar to them. If you put me and a chimpanzee on a lonely island, I would definitely place my bet on the chimpanzee.

- Humans are the only animals that can cooperate both flexibly and in very large numbers. Other animals, like the social insects, the bees, the ants, and the chimpanzees, can cooperate flexibly, but only in small numbers.

- I want to cooperate with you, but I need to know you personally. Are you a nice chimpanzee?

- Humans are the only animals that can combine the two abilities together and cooperate both flexibly and still do so in very large numbers. Chimpanzees cannot cooperate at all, and if you try to cram 100,000 chimpanzees into Oxford Street, you will get chaos. Think even about this very talk that I'm giving now: I don't know all the people who are in this audience, I don't know the people who made this microphone, and I don't know the people who wrote these books.

- Even though we don't know each other, we can work together to create a global exchange of ideas. Chimpanzees cannot do this, because they don't

1440

✎

Original

Why humans run the world | Yuval Noah Harari — 1421

▷ 0:13 — 1422    1423

Seventy-thousand years ago, our ancestors were insignificant animals. The most important thing to know about prehistoric humans is that they were unimportant. Their impact on the world was not much greater than that of jellyfish or fireflies or woodpeckers. Today, in contrast, we control this planet. And the question is: How did we come from there to here? How did we turn ourselves from insignificant apes, minding their own business in a corner of Africa, into the rulers of planet Earth?

▷ 0:51

Usually, we look for the difference between us and all the other animals on the individual level. We want to believe -- I want to believe - that there is something special about me, about my body, about my brain, that makes me so superior to a dog or a pig, or a chimpanzee. But the truth is that, on the individual level, I'm embarrassingly similar to a chimpanzee. And if you take me and a chimpanzee and put us together on some lonely island, and we had to struggle for survival to see who survives better, [would definitely place my bet on the chimpanzee, not on myself. And this is not something wrong with me personally. I guess if they took almost any one of you, and placed you alone with a chimpanzee on some island, the chimpanzee would do much better.

DOCUMENT SUMMARIZER

RELATED APPLICATIONS

This application is a continuation of International Application No. PCT/US2023/020647, filed on May 2, 2023, which claims priority from U.S. Provisional Patent Application No. 63/337,323, filed on May 2, 2022. The disclosures of the above-referenced applications are expressly incorporated herein by reference in their entireties.

BACKGROUND

The disclosed technology relates generally to natural language processing from an automated computer-based system. More specifically, the disclosed technology includes the use of natural language processing techniques to automatically analyze the semantic context of an input text document and generate a summary of the input text document. While prior systems are able to generate document summaries, these systems lack the ability to account for various characteristics of the input text document in generating a summary. For example, prior systems do not rely upon visual characteristics or formatting structure of the input text document (e.g., multiple columns of text; page breaks; images interrupting the middle of a paragraph of text; etc.). As a result, prior systems often generate disjointed or incomplete summaries in the presence of such visual characteristics or formatting structure.

The disclosed embodiments are aimed at addressing the deficiencies of prior systems by generating summaries using a fusion of semantic context analysis relative to a particular input text document together with analysis of visual characteristics/formatting structure of the input text document.

SUMMARY

The presently disclosed embodiments may include a computer readable medium including instructions that when executed by one or more processing devices cause the one or more processing devices to perform a method. The method may include receiving an identification of at least one source text document, loading text of the at least one source text document, and segmenting the text of the at least one source text document into two or more segments, wherein the segmentation is based on both formatting of the at least one source text document and semantic context of the text of the at least one source text document. The method may further include analyzing the segmented text of the at least one source text document, generating, based on the analysis, at least one summary snippet associated with one or more portions of the text of the at least one source text document, wherein the at least one summary snippet conveys a meaning associated with the one or more portions of the text, but includes one or more textual difference relative to the one or more portions of the text of the at least one source text document, and causing the at least one summary snippet to be shown on a display.

The presently disclosed embodiments may include a computer readable medium including instructions that when executed by one or more processing devices cause the one or more processing devices to perform a method. This method may include receiving an identification of at least one source audio or video with audio file, generating a textual transcript based on an audio component associated with the at least one source audio or video with audio file, and editing the textual transcript to provide a formatted textual transcript. The method may further include segmenting the formatted textual transcript into two or more segments, generating, based on analysis of the two or more segments, at least one summary snippet associated with the two or more segments, wherein the at least one summary snippet conveys a meaning associated with at least one of the two or more segments, but includes one or more textual differences relative to at least one of the two or more segments, and causing the at least one summary snippet to be shown on a display together with a representation of the at least one source audio or video with audio file.

BRIEF DESCRIPTION OF DRAWING(S)

Figure 7:
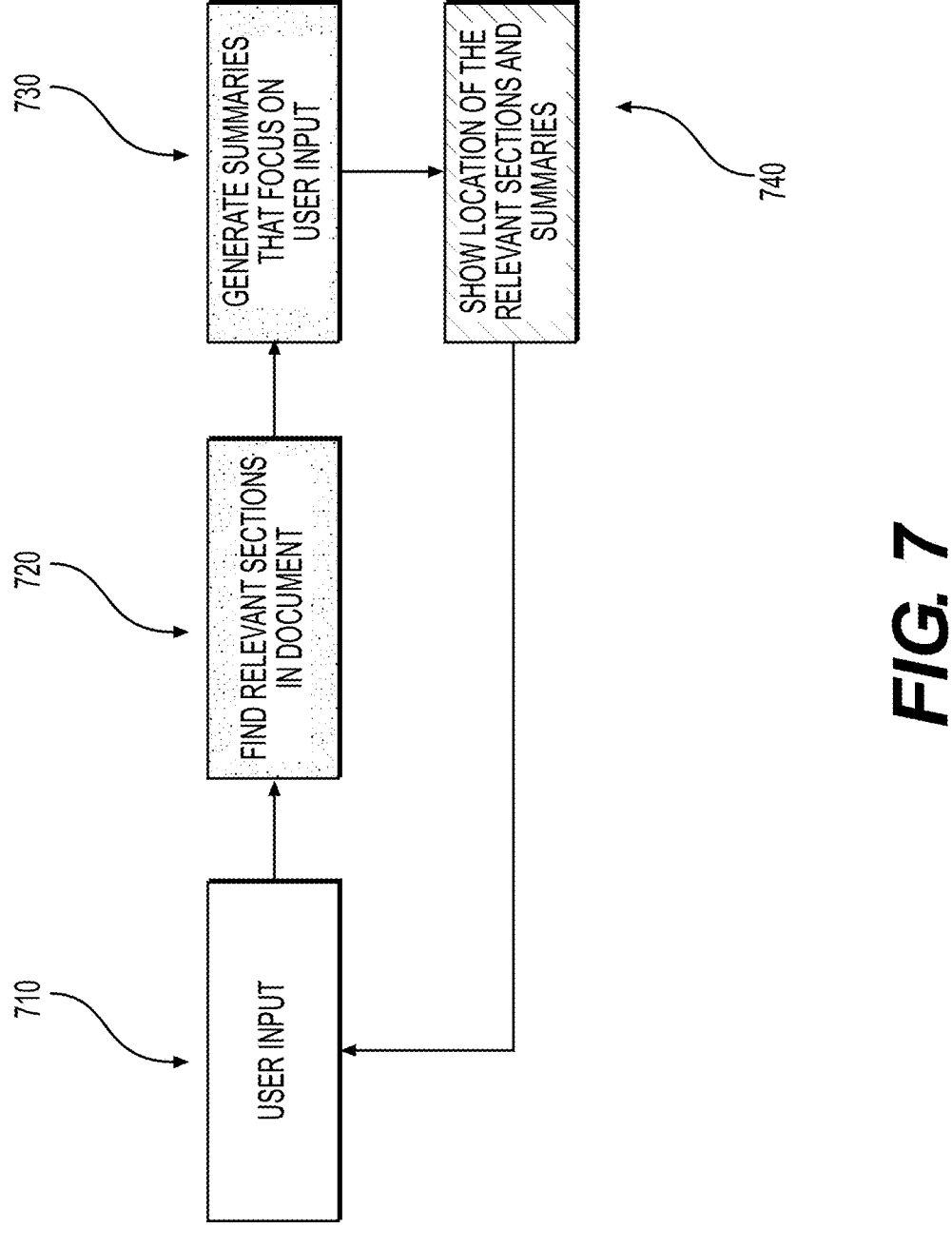

FIG. 7 provides a block diagram representation of the process flow of the guided summarization feature of the disclosed reading assistant tool.

Figure 8:
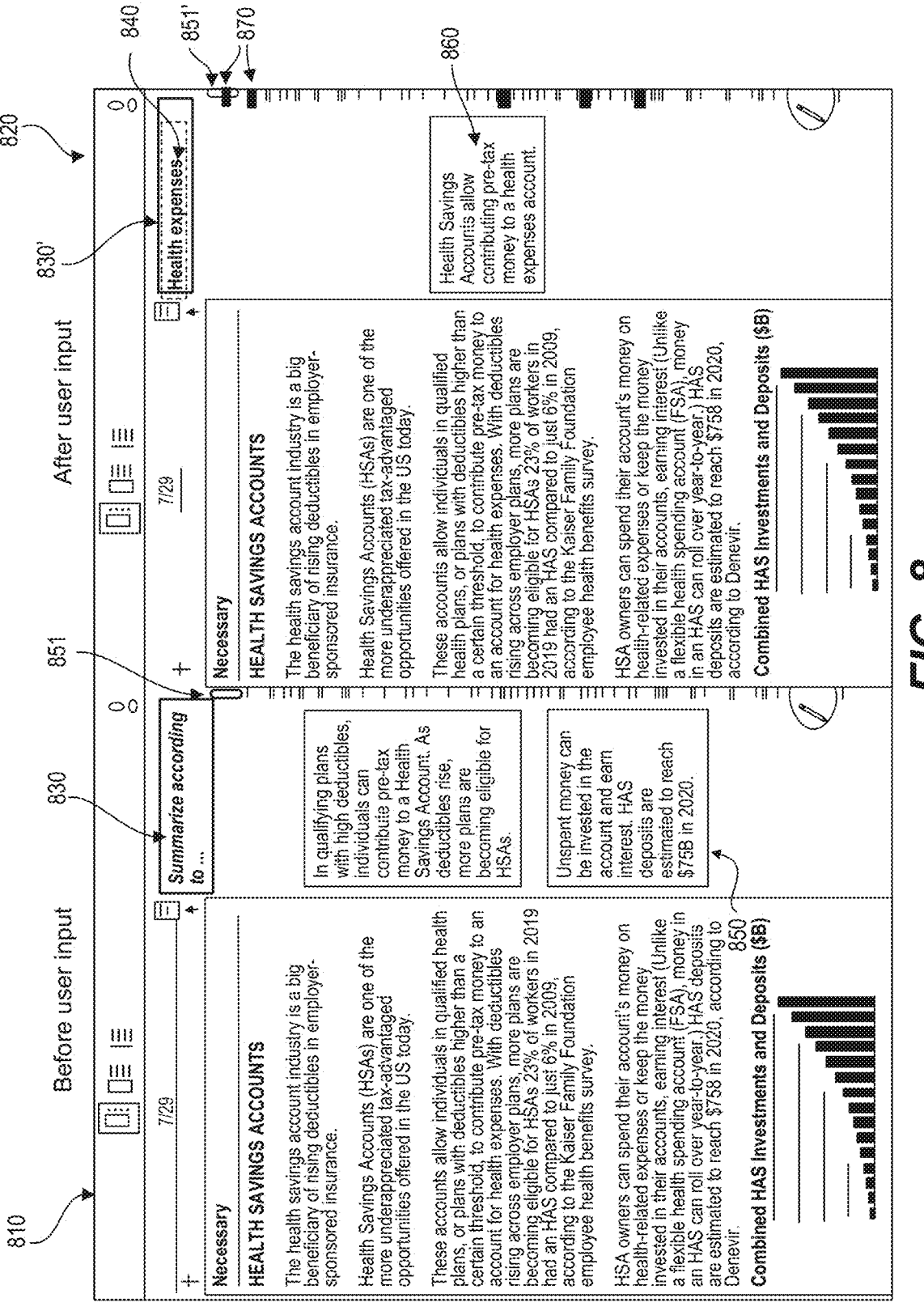

FIG. 8 illustrates an example of the guided summarization functionality of embodiments of the disclosed reading assistant tool.

Figure 9:
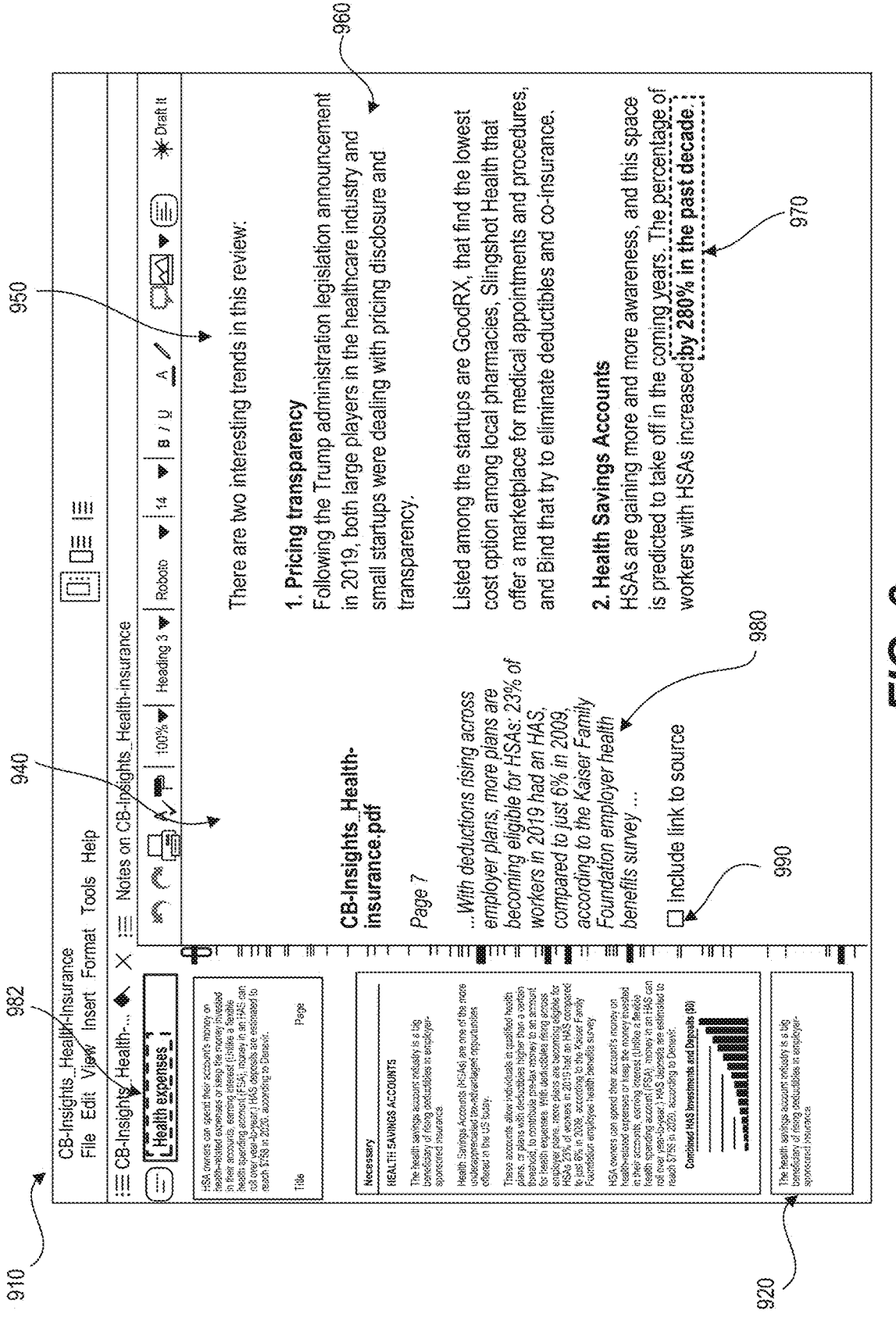

FIG. 9 illustrates an example of the content-based text completion functionality of embodiments of the disclosed reading assistant tool.

Figure 10:
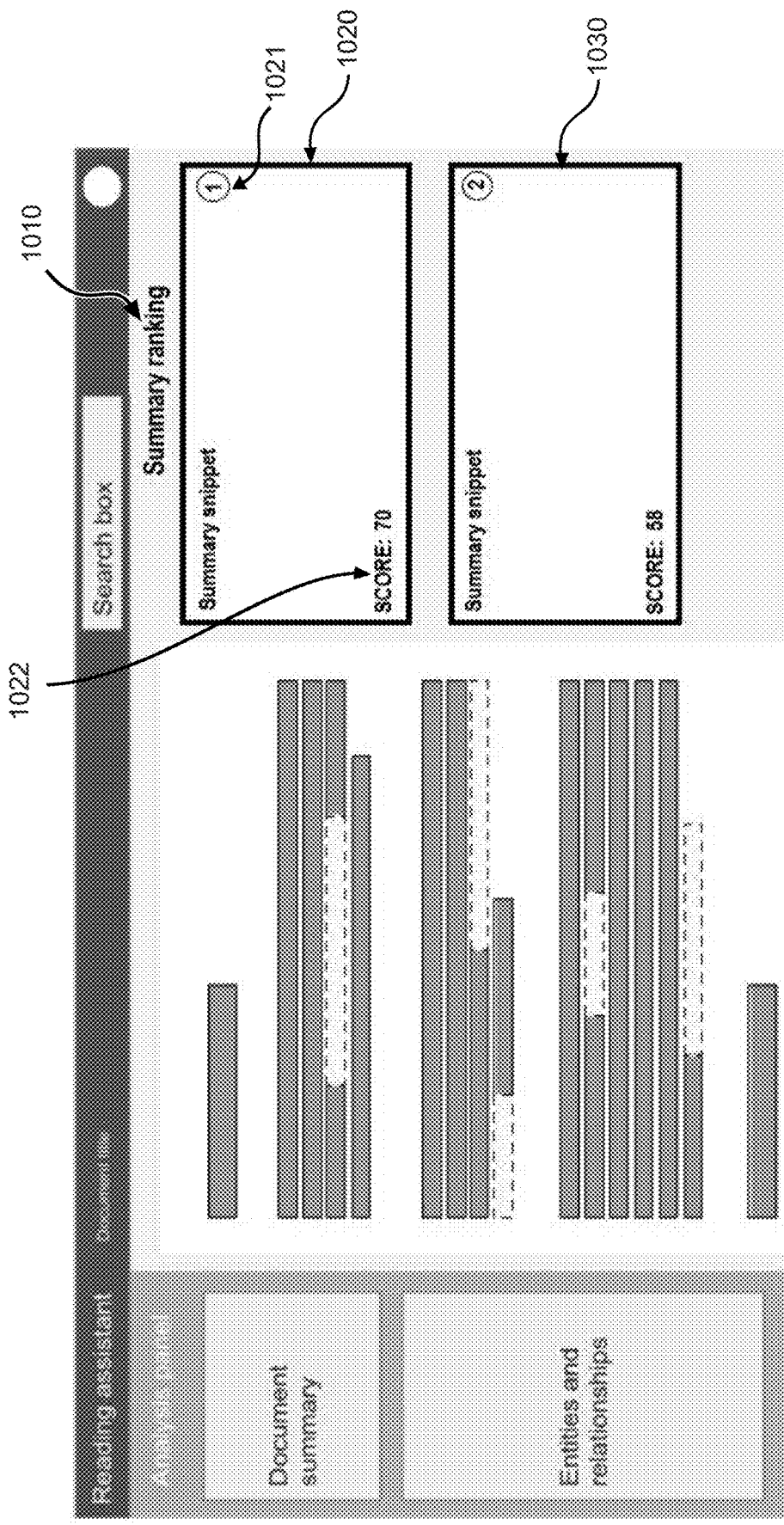

FIG. 10 illustrates an example of a ranking of summary snippets shown with corresponding spread scores.

FIG. 11 provides an example of document segmentation and summarization techniques associated with embodiments of the disclosed reading assistant tool.

Figure 12:
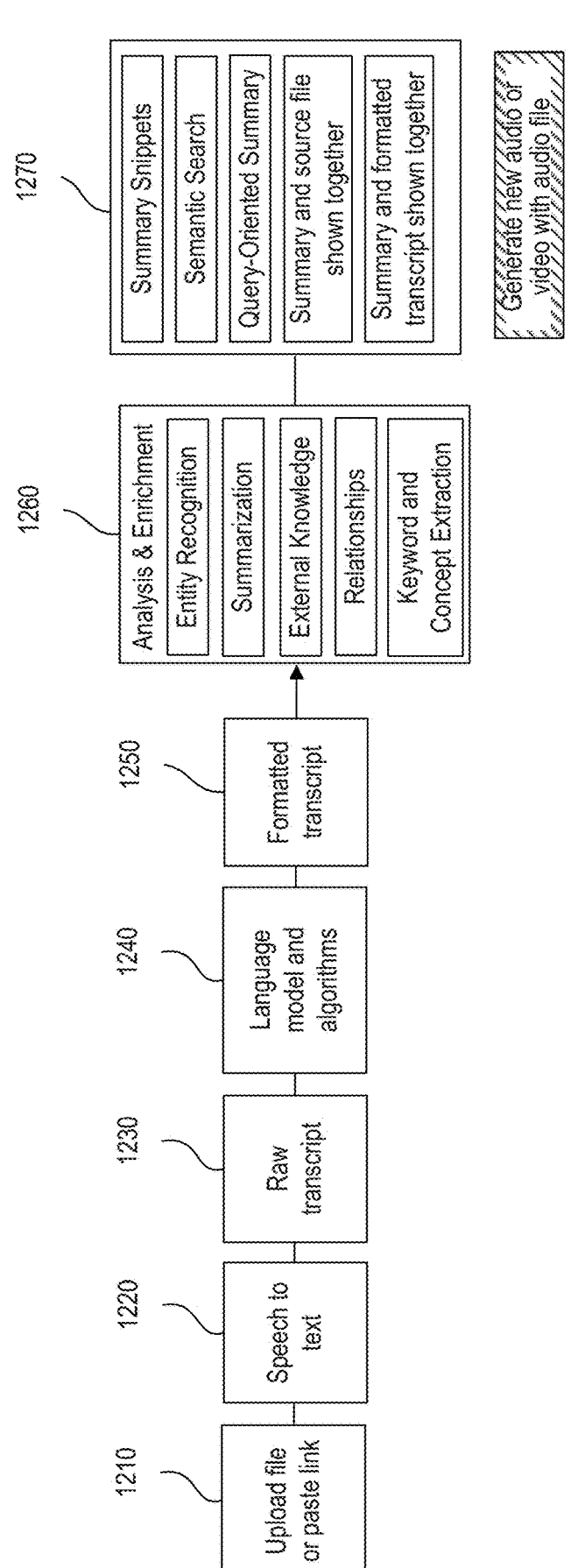

FIG. 12 represents an example operation flow associated with an audio and video transcriber and summarizer tool according to disclosed embodiments.

Figure 13:
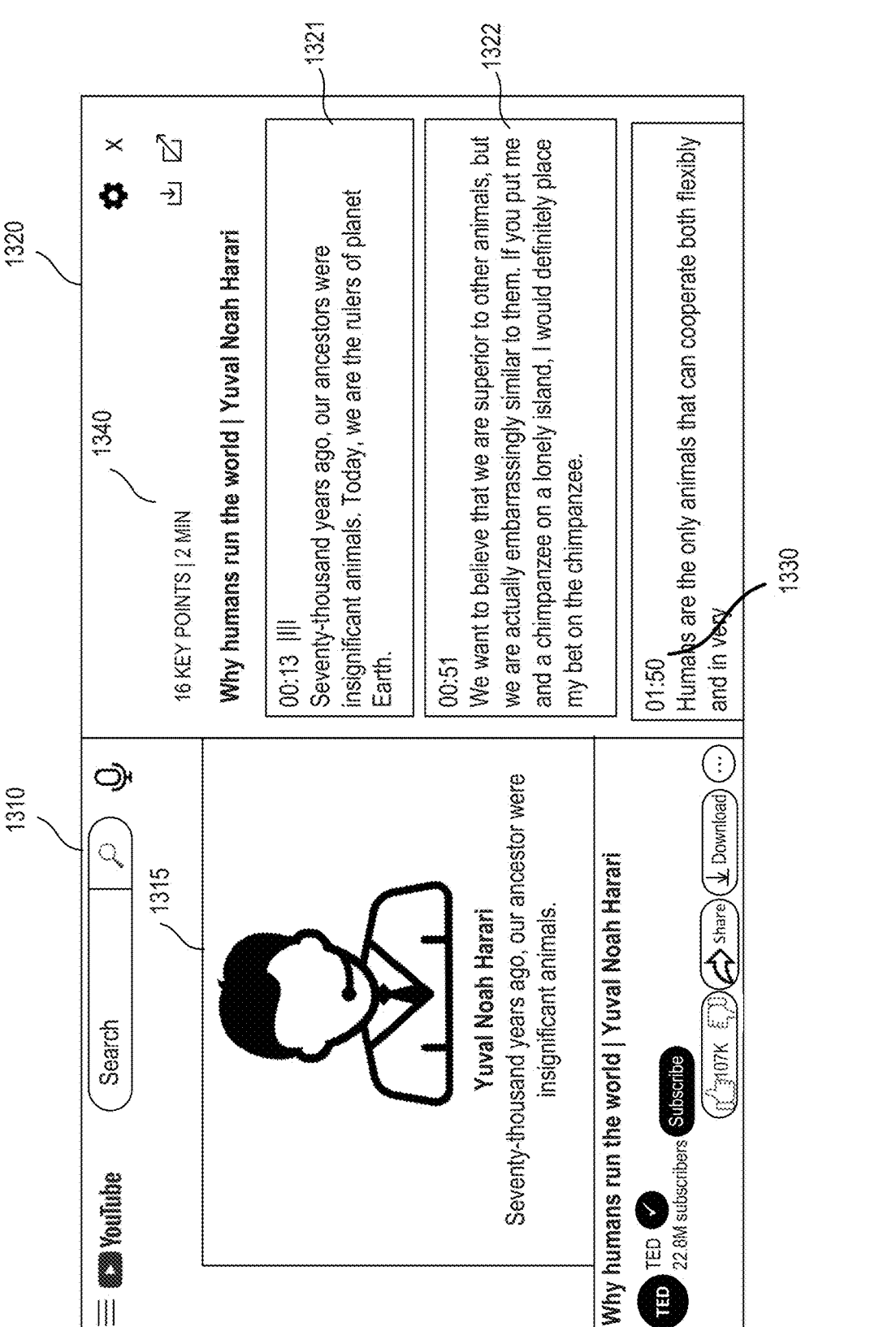

FIG. 13 represents an example of a source audio or video with audio files displayed at the same time as its associated summary snippets.

FIG. 14. represents an example of a formatted transcript generated by the audio and video transcriber and summarizer tool displayed at the same time as its associated summary snippets.

DETAILED DESCRIPTION

The disclosed embodiments relate to a reading assistant system designed to generate summaries of input text documents. For many, the task of reading lengthy text documents can be arduous and time-consuming. The speed of reading can be slow due to the presence of learning difficulties such as dyslexia and, as a result, it can be particularly taxing to consume text documents. In other cases, the volume of textual material a particular user may wish to consume may exceed the amount of material the user can read within applicable time constraints. To address these issues, the disclosed embodiments automatically generate document summaries based on provided input text documents. One aim of the disclosed systems is to reduce the amount of time needed for a user to consume information included in textual documents.

Document Summarizer

Figure 1:
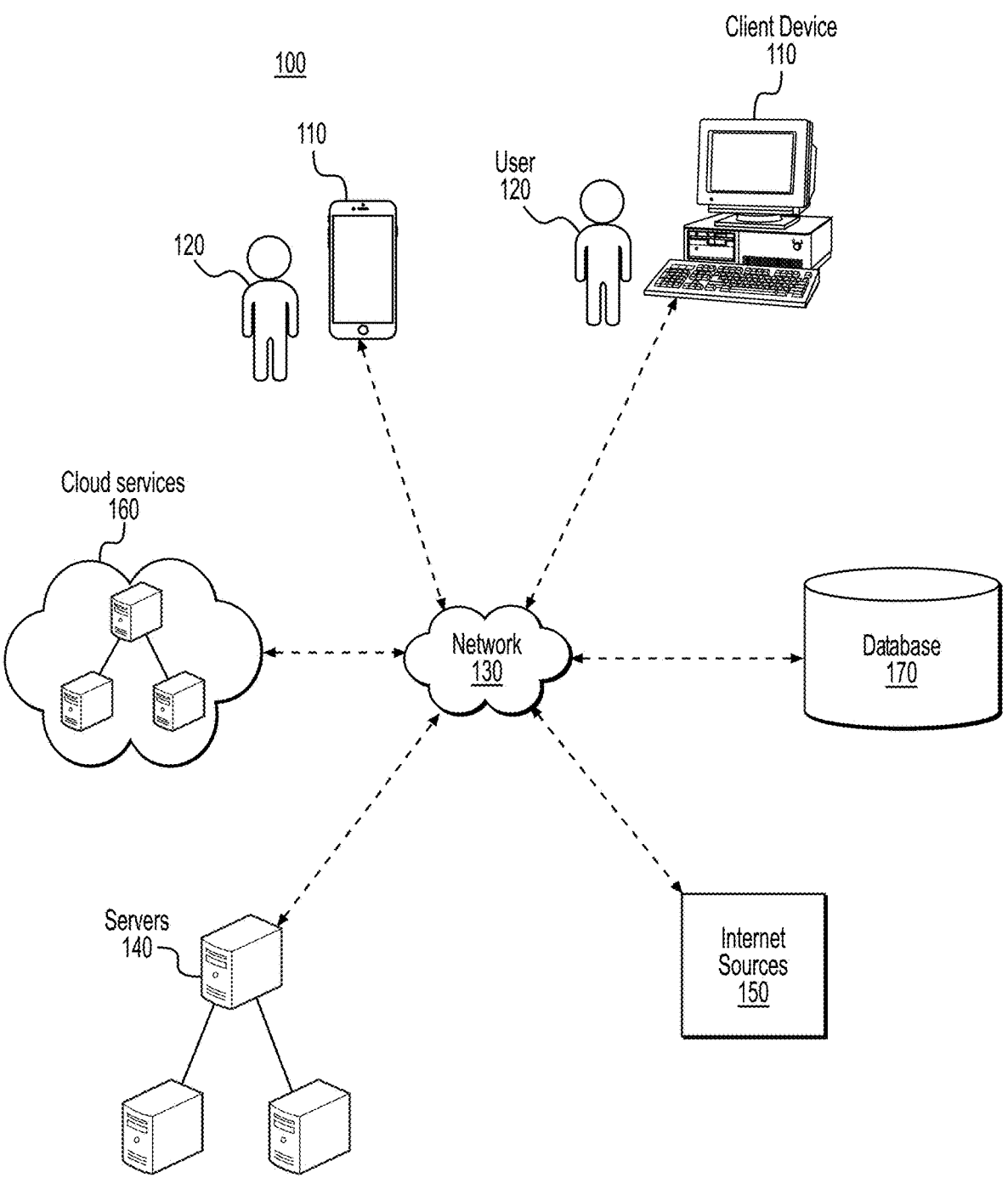
FIG. 1 is a diagram illustrating an exemplary system environment in which the disclosed reading assistant may be used, consistent with disclosed embodiments.

FIG. 1 is a schematic diagram of an exemplary system environment in which the disclosed reading assistant may be employed. For example, system 100 may include a plurality of client devices 110 operated by users 120. System 100 may also include a network 130, server 140, internet resources 150, cloud services 160, and databases 170. The components and arrangement of the components included in system 100 may vary. Thus, system 100 may include any number or any combination of the system environment components shown or may include other components or devices that perform or assist in the performance of the system or method consistent with the disclosed embodiments. Additionally, the disclosed reading assistant system may be implemented on any single component shown (e.g., a single mobile device or single PC included in client devices 110) or may be implemented in a network architecture (e.g., one or more features of the disclosed reading assistant systems and methods being implemented on a server 140, associated with one or more cloud services 160, etc. and having connectivity established with one or more client devices 110 via network 130 (e.g., a WAN, LAN, Internet connection, etc.)).

As shown in FIG. 1, client devices 110 may include a variety of different types of devices, such as personal computers, mobile devices like smartphones and tablets, client terminals, supercomputers, etc. Client devices 110 may be connected to a network such as network 130. In some cases, a user 120 may access the reading assistant and its associated functionality via the client device 110 which can display the user interface of the reading assistant.

Figure 2:
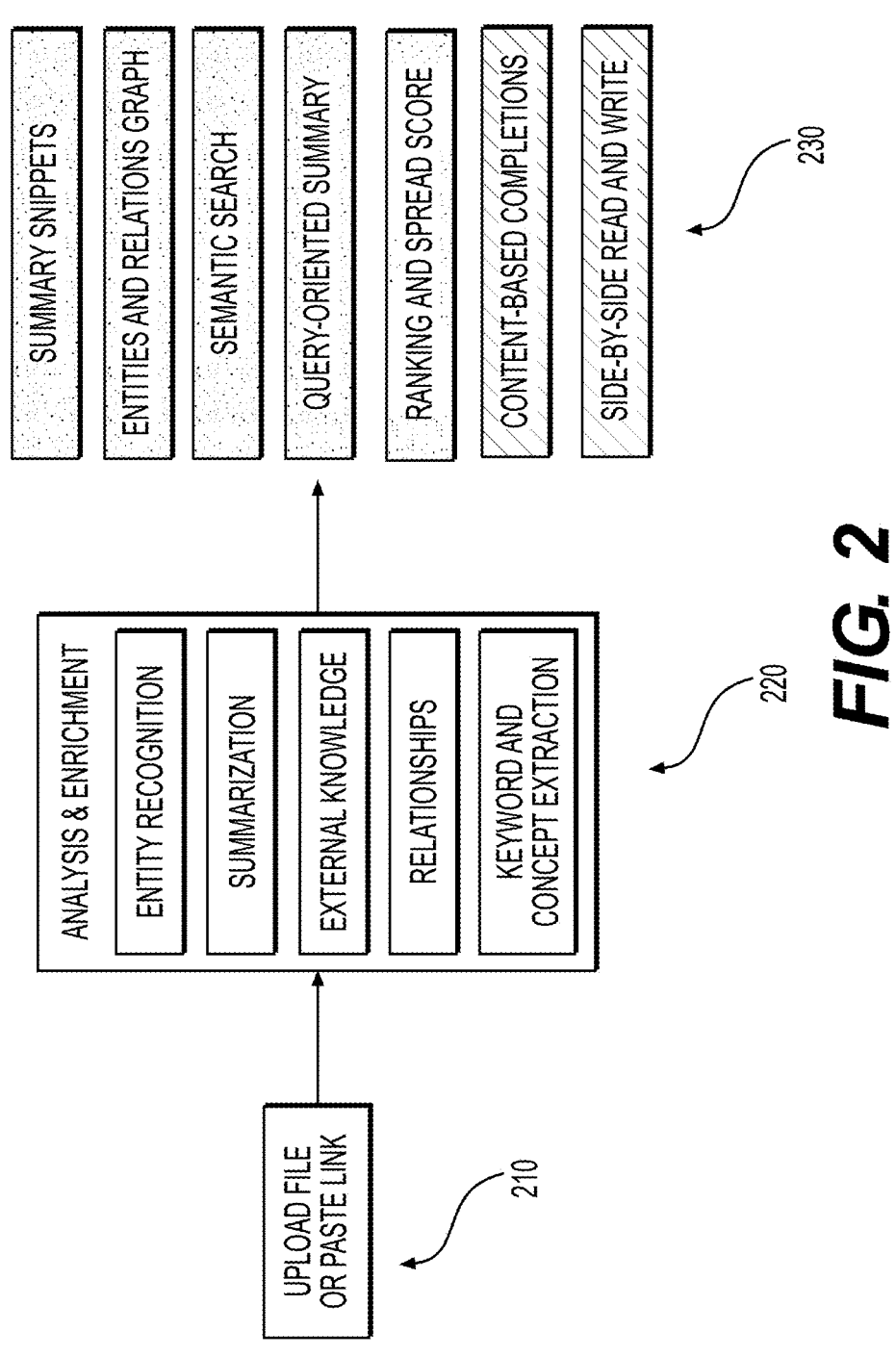
FIG. 2 represents an example operation flow associated with a reading assistant tool according to exemplary disclosed embodiments.

FIG. 2 represents an example operation flow associated with a reading assistant tool according to exemplary disclosed embodiments. For example, step 210 includes acquiring text on which the reading assistant tool is to operate. The text may be acquired from various types of text files loaded or identified through an interface of the reading assistant tool.

Next, at step 220, the reading assistant tool can analyze and enrich the acquired text. For example, using AI-based models, trained neural networks, etc., the reading assistant tool can analyze the acquired text to do any of the following actions: identify and/or recognize entities described in the acquired text (even those identified by pronouns); summarize facts, information, argument, points, etc. associated with the acquired text; draw on external knowledge sources (e.g., databases, documents, etc. available via the Internet or other network) to augment information etc. conveyed by the acquired text; identify relationships between various types of entities associated with the acquired text; identify and/or extract keywords and key concepts from the acquired text; among other suitable tasks.

Based on the results of the reading assistant tool's analysis in step 220, the reading assistant tool can generate various types of outputs at step 230 to assist a user in working with/understanding the acquired text. For example, the reading assistant tool can generate summary snippets based on segments of the acquired text. The summary segments may convey key information or points associated with segments of the acquired text, while including one or more modifications to those segments. The modifications may include changing words, omitting words, substituting words, simplifying language complexity, removing phrases, adding words or phrases, etc.

In some cases, the reading assistant tool may generate an entities and relations graph, which graphically (or textually in some cases) identifies entities referenced in the acquired text and represents relationships between those entities. Information relating to the graphed relationships may be derived from the acquired text or may be augmented based on access to external knowledge sources (e.g., Internet databases, documents, etc.).

Step 230 may include a semantic search capability and/or query-oriented summaries. For example, a user can enter search text into an input field (e.g., a query box, etc.), and the reading assistant tool can find words and phrases in a single source document or in multiple source documents provided as input that correlate with the contextual meaning of the input search text. The search text provide by the user can also be used for other purposes. For example, in some cases, the reading assistant/document summarizer tool can use the input search text as a guide in generating or updating one or more summary elements to emphasize certain semantic meanings, entities, relationships, facts, arguments, etc. indicated by the search text as of particular interest to a user.

As noted, in some cases, the user input received via a semantic search window may be used to analyze a collection of multiple source documents received or identified as input. For example, given a collection of documents and a user input (e.g., input text representative of semantic search query), the system can generate a summary of the information found in the collection of documents that is relevant to the user input. The user input may be provided as free text, and may include, among other things: a mention of a specific entity, a statement, a question, etc. One or more summaries generated based on the user input and the collection of documents may be linked to the source text/information included in the collection of documents, so that the user can jump from any portion of the summary to the relevant parts of a particular document or group of documents from which a summary snippet sentence was derived.

As part of the generation of summary snippets based on segments of the acquired text, the disclosed systems may rely upon determined spread scores associated with the snippets. For example, the document summary/reading assistant system may include one or more algorithms that compare a set of potential summaries to a particular text. The potential summaries may be ranked according to the degree to which the information contained in each summary is spread throughout the text (e.g., how frequently information from a summary appears in the text, how much of the text is related to or implicated by a summary, etc.). The higher the "spread score" for a particular summary, the more of the text's information is conveyed by the summary.

The determined spread scores for potential summaries can be used in determining which summaries to show to a user. For example, based on the spread scores for a set of potential summaries, the document summarizer/reading assistant system can rank the potential summaries. Those with higher rankings (meaning that more of the information in the source text is represented by those summaries as compared to other summaries with lower rankings) may be selected for showing to the user. For example, at step 230, the reading assistant tool may use the spread score and/or spread score rankings for a set of potential summary snippets to determine which of the potential summary snippets are shown to or made available to the user. In other words, when determining which summary snippet(s) to make available to a user, among multiple alternative summary snippets, the system may rely upon the spread score information to determine which snippet option(s) represent more of the information of a portion (e.g., a paragraph, section, page, etc.) of the input source text.

At step 230, the reading assistant tool may also offer content-based completion functionality. For example, via an interface associated with the reading assistant tool, the system may offer text suggestions, as the user inputs text (e.g., capturing notes or thoughts of the user relative to the input text and/or the generated summary snippets). In some cases, the user may augment the generated summary snippets by inputting additional text into one or more summary snippets. As the user enters text, the system may offer suggestions for content completion. Text suggestions offered to the user may include single words or short phrases. In other cases, however, the system may offer text suggestions in the form of one or more complete sentences. These text suggestions can also be based on the context and content of source text from one or more input text documents loaded into or identified to the reading assistant tool (or based on externally accessible sources).

At step 230, the reading assistant tool may also offer side-by-side read and write capability. For example, any of the summary elements generated based on the text analysis performed in step 220 may be shown in an interface of the reading assistant tool in a side-by-side relation to source text to which the summary elements relate. The interface of the reading assistant tool may also provide a text editor window such that the user can draft text while having proximate access to the source text and summary elements relating to the source text.

Figure 3:
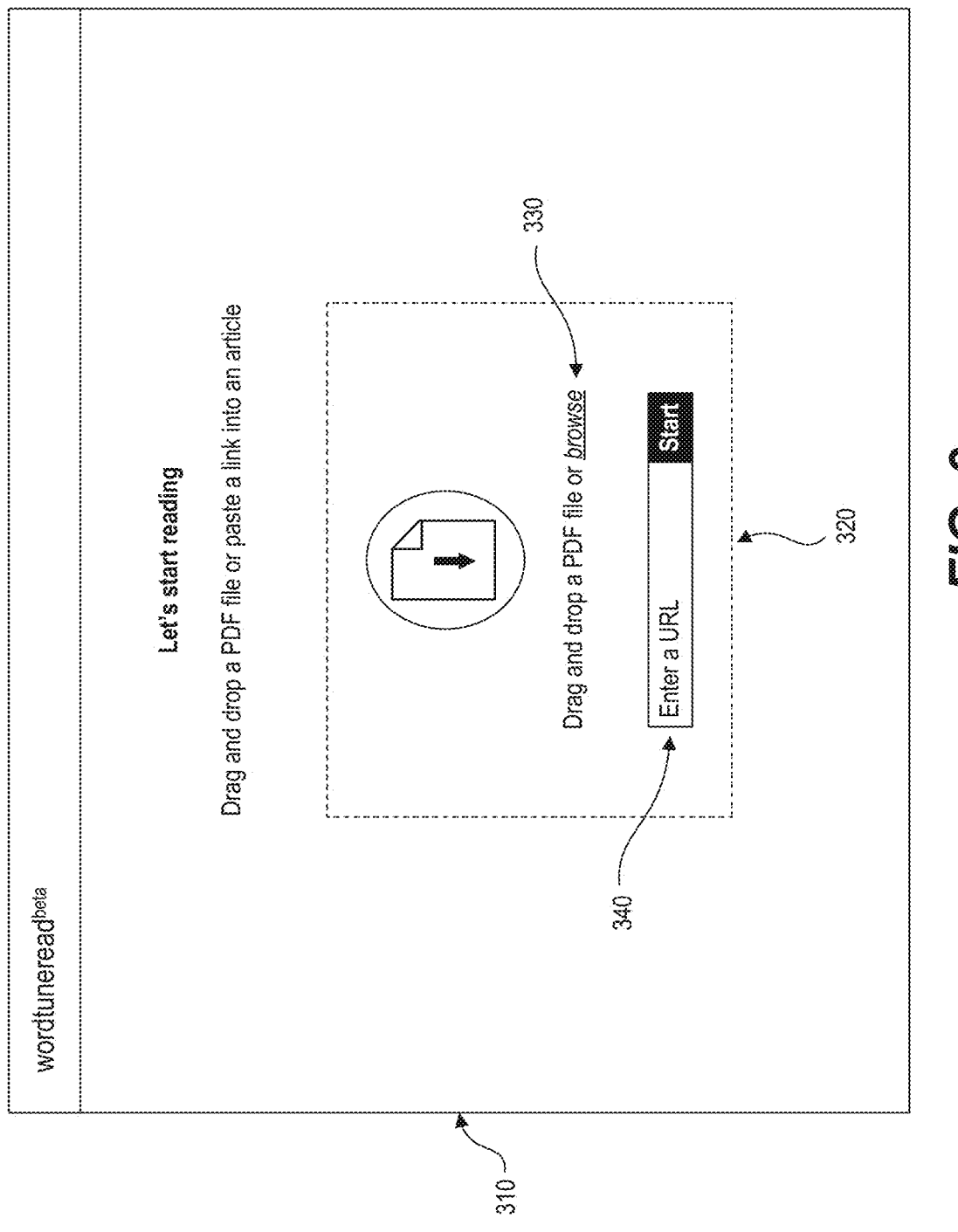
FIG. 3 represents an example of an initial document intake interface of a reading assistant tool according to exemplary disclosed embodiments.

Returning to step 210, an interface of the reading assistant tool may include any suitable interface for loading or identifying text documents. For example, activation of the reading assistant tool may cause a window, such as window 310 shown in FIG. 3 to be shown on a display. Window 310 may include an active area 320 to facilitate identification of source text documents to the reading assistant tool. For example, a user may drag and drop text files into active area 320 to load documents into the reading assistant tool. Alternatively or additionally, a user may click on a "browse" link to access a file system associated with one or more storage devices and may select one or more text files from the file system for loading into the reading assistant tool. Further, a user may type or copy and paste an address, such as a URL, into address field 340 in order to identify to the reading assistant tool one or more documents to access and load. Any of these techniques can be used alone or in combination to load documents into the reading assistant tool, especially as the reading assistant tool can load and operate upon multiple documents from multiple different sources or storage locations in a single session.

Figure 4:
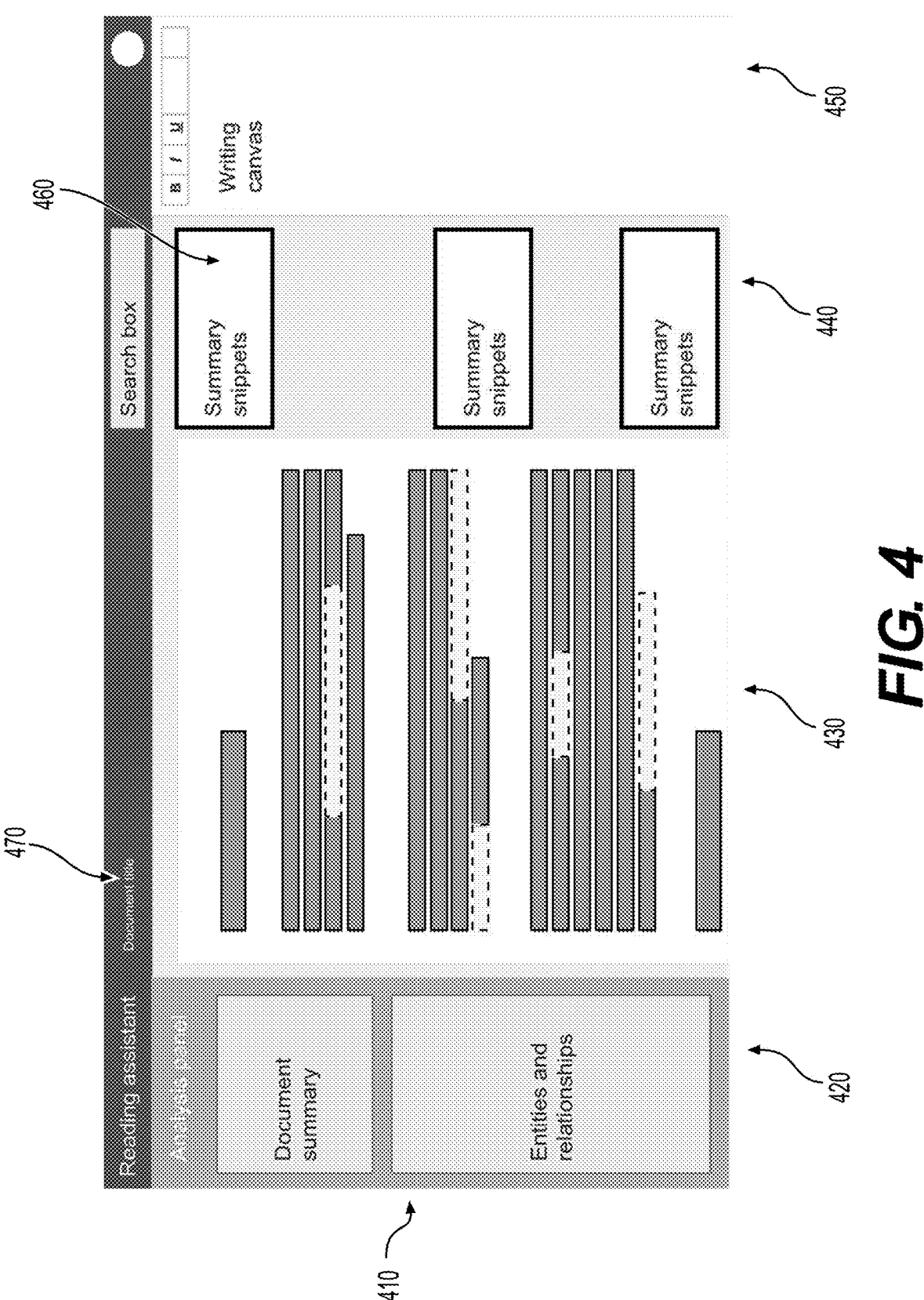
FIG. 4 represents an example of a generic summary window interface of a reading assistant tool according to exemplary disclosed embodiments.

Upon loading one or more text documents, the reading assistant tool can analyze the loaded text documents (step 220) and can generate one or more summaries relative to the loaded text documents. The generated summaries can be shown to the user in any suitable format. FIG. 4 provides a block diagram representation of a generic summary window 410 that may be included in an interface associated with the disclosed reading assistant tool. Window 410 may be arranged with various different layouts and may include various combination types and combinations of display windows, scroll bars, summary snippet bubbles, text entry fields, virtual buttons, toolbars, drop down menus, etc. In the particular example shown in FIG. 4, interface window 410 includes an analysis panel 420, a text review panel 430, a summary panel 440, and a writing panel 450.

Each panel type, along with its exemplary associated functions and features, is discussed in more detail below. In general, however, analysis panel 410 may provide one or more portals to results of analysis performed by the reading assistant tool in step 220. Such results may include: information relating to identified entities and entity relationships; compressed text summaries; information extracted from external knowledge sources; keyword and concept extraction; among others.

Text review panel 430 may include a reproduction of at least a portion of the text analyzed in one or more input/source text documents loaded into the reading assistant tool. Text shown in the text review panel 430 may include highlighting, underlining, bolding, or other types of emphases to indicate what portions contributed to summaries, such as summary snippets 460 included in summary panel 440. Writing panel 450 can receive text entered by a user, text copy and pasted (or drag and dropped) from text review panel 430 or from text snippets 440, for example.

Interface window 410 may include various other types of information or functionality. For example, interface window 410 may identify a document's meta-datum (e.g., a document title 470) to identify the file name or other document identifier associated with the particular source text file (or a project text file including text from multiple source text files) under review.

Figure 5:
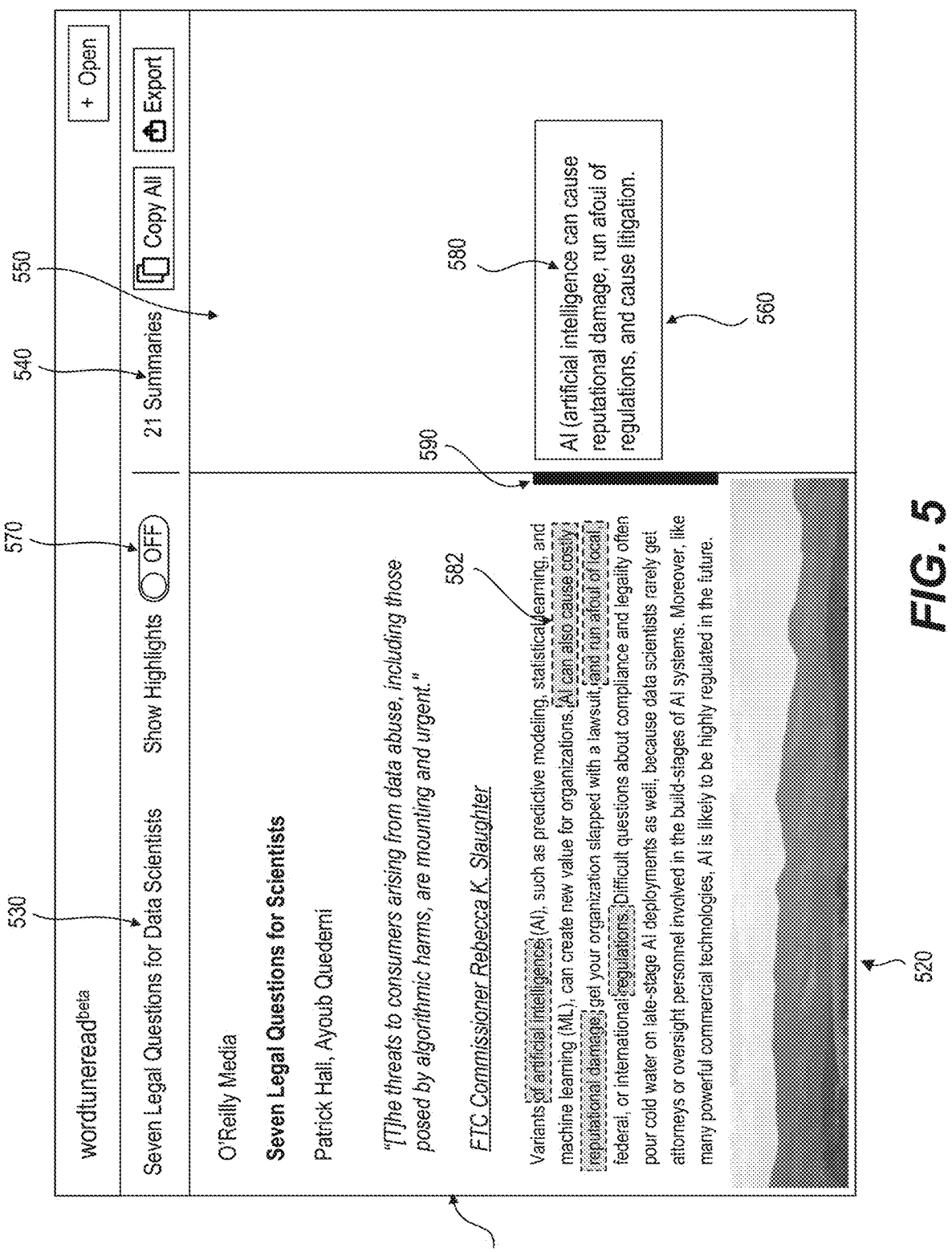
FIGS. 5 and 6 represent example views provided by a summary window interface of a reading assistant tool according to exemplary disclosed embodiments.

FIG. 5 provides an example of a summary interface window 510 that may be generated by the reading assistant tool. In this example, window 510 includes a text review panel 520 that includes a reproduction of a portion of a source text document (i.e., and article entitled, "Seven Legal Questions for Data Scientists") loaded into the reading assistant tool. The name of the source text document is also shown in title field 530.

After analyzing the source text document and generating one or more summaries relative to the document, the reading assistant tool can show the generated summaries on a display. In the example of FIG. 5, a number of summaries field 540 indicates how many summaries the reading assistant tool generated during the analysis phase, and the summaries can be shown in a summary window 550. In this example, the summaries are shown in summary snippet boxes 560, however, any other suitable format (e.g., text bubbles, bulleted outline, etc.) may be used to show the generated summaries on a display.

Each summary generated may be based upon at least some portion of the text in a source text document loaded into the reading assistant tool. In the example of FIG. 5, the reading assistant tool may be equipped to identify to the user a portion or portions of the source text document(s) that contributed to the generation of a particular summary. For example, as shown in FIG. 5, text relating to a particular summary can be highlighted, underlined, bolded, etc. to indicate that it relates to at least one generated summary. A highlights toggle bar 570 may be provided to enable the user to toggle on and off the highlighting of text used in generating one or more summaries.

Links between generated summaries and the associated text based on which they were generated may be indicated in any suitable manner. For example, as shown in FIG. 5, a generated summary, including a summary snippet 580 shown in summary snippet box 560, may be displayed next to its corresponding text in a source document (e.g., the text based on which the summary snippet was generated). In this example, the reproduced text from the source text document is shown in text review panel 520 with highlighted text 582. The proximity of summary snippet 580 to highlighted text

582 can indicate to a user that highlighted text 582 contributed to the generation of summary snippet 580. In some cases, especially where the density of generated summary snippets is higher, other indicators, such as lead lines, color coding, etc. may be used to indicate relationships between generated summaries and text used to generate the summaries.

Interface window 510 may include various tools and controls to assist a user in efficiently reviewing and understanding content included in the source text documents loaded into the reading assistant tool. For example, as indicated by the number of summaries field 540, in the example of FIG. 5, the reading assistant tool has generated 21 summaries based on its analysis of at least the loaded source text document partially reproduced in text review panel 520. To review the generated summaries, the user can interact with a scroll bar (not shown). For example, dragging a scroll bar downward may cause the text shown in text review panel, as well as the generated summaries shown in summary review panel 550 to migrate upwards on the display screen to bring additional text from source document and additional generated summaries into view on the display. In this way, a user can quickly scroll through the generated summaries and develop a good understanding of the source document through review of the generated summaries alone. Should the user wish to clarify any details or to gain further context relative to any particular generated summary, the side-by-side display of source text (optionally with highlighting) and corresponding summaries may enable the user to quickly access the text in the source document most pertinent to a particular summary. And, if the user wishes to review the complete text of the source document, it is available and shown in the text review panel 520. To further illustrate the original text to which a generated summary relates, the reading assistant tool may include a highlight bar 590 identifying a portion of the original text for which one or more summaries were generated.

As noted above, a component of the analysis performed by the reading assistant tool in step 220 is the identification of entities referenced by source text documents and the determination of relationships among those entities as conveyed by the source text documents (and optionally as augmented by external knowledge sources). Through analysis of the source text documents, for example, the reading assistant tool can automatically create a knowledge graph of entities (e.g. a person, organization, event, process, task, etc.) mentioned/referenced in unstructured text in source text documents. The knowledge graph may include, among other things, entities, relations between entities, information about the entities, and instances of each entity in the text. The different instances of each entity are extracted and associated with the entity even if the entity was diversely and implicitly referenced (including reference by a pronoun, semantic frames where the entity has a semantic role not explicitly stated, etc.). The knowledge graph can also be generated or augmented based on access to external knowledge sources (e.g., accessible Internet sources, private knowledge bases, or knowledge bases local to the reading assistant tool). Using such sources can provide further information on the entities and the relations among the entities.

In some cases, the knowledge graph refers to the entity relationships identified and maintained internal to the models/networks associated with the reading assistant tool. In other cases, the knowledge graph may be provided to a user. For example, a user may click on a knowledge graph portal (such as the "Entities and Relationships" active region/ clickable area/button shown in FIG. 4), and the reading assistant tool may show on the display the results of its entity and relationships analysis relative to the source text documents. In some cases, the knowledge graph may be represented to a user in a graphical format (e.g., entities identified in boxes or bubbles that may be arranged, connected by lines, associated with symbols, etc. to convey information about relationships, hierarchies, etc. among the identified entities). In other cases, the knowledge graph may be represented to the user in a text-based format (e.g., list, outline, etc.).

Other features or functionality of the reading assistant tool can also enable the user to interact with loaded source text documents, especially with respect to entities identified or referenced in the source text documents. For example, in some embodiments, the user can select a span of text in a loaded source text document, and in response, the reading assistant can display to the user the entities referenced in the selected span of text. In another example, a user may mark/identify multiple documents (e.g., by clicking on, highlighting, etc. icons or filenames representative of the documents), and in response, the disclosed reading assistant/document summarizer system may generate an entity graph indicative of entities identified across the multiple documents. The entity graph may include a comprehensive list of entities referenced in the multiple documents and may indicate which of the documents refer to which entities. The entity graph may also include information conveying how many times each identified entity is referenced by each of the multiple documents.

Additionally or alternatively, the reading assistant tool can enable the user to view or navigate to other instances of the same entity or to other related entities in the source text documents. Further, the reading assistant tool can enable the user to view information about the entity that the tool extracted from the source text documents or acquired from external sources.

Figure 6:
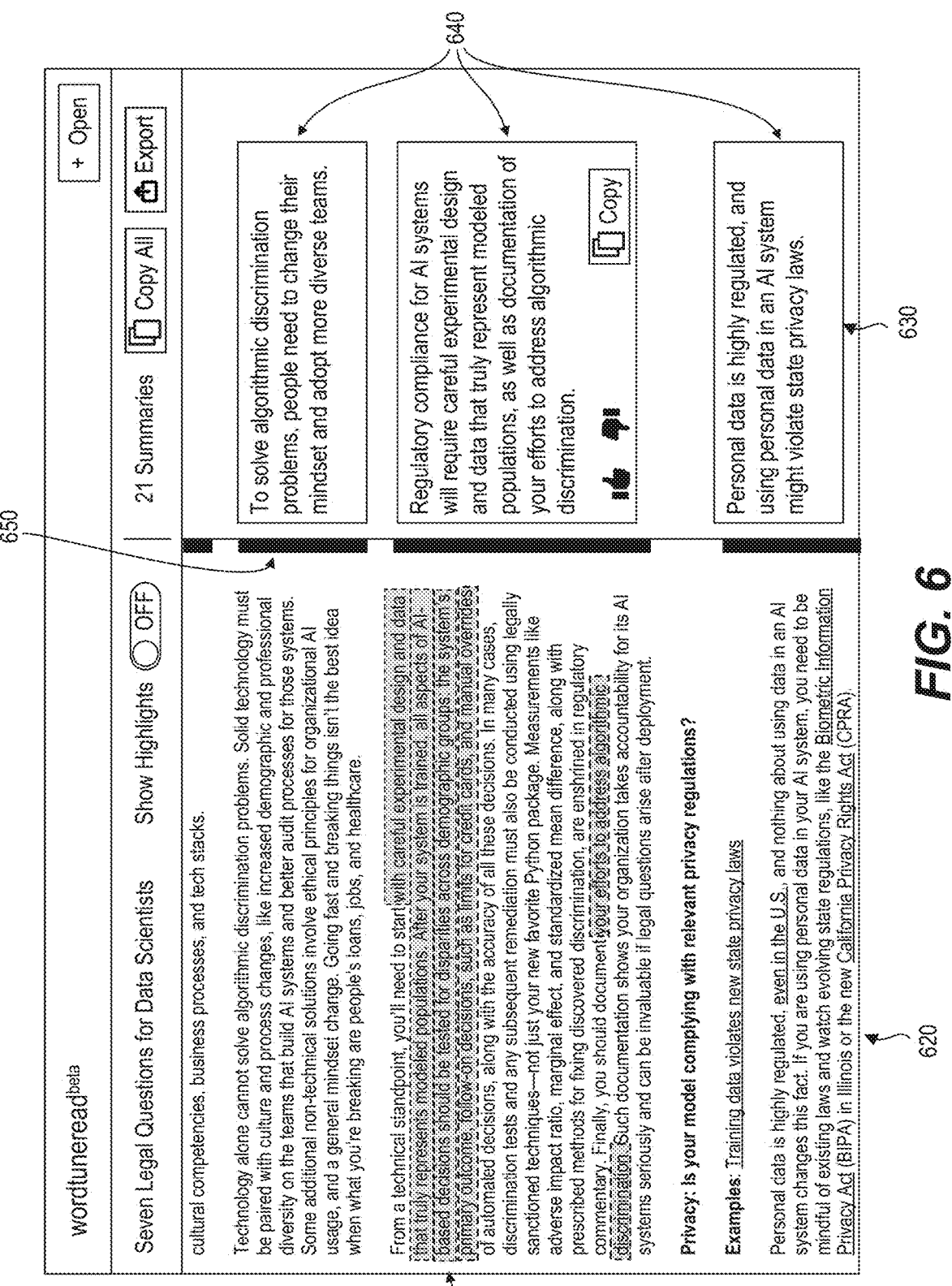

FIG. 6 provides another example of a summary window interface 610 provided by an embodiment of the described reading assistant tool. Summary window interface 610 includes a text review panel 620 shown in side-by-side relationship to a summary review panel 630. In this example, three summaries, including summary snippets 640, have been generated based on text from the source document currently shown in the text review panel 620. As an additional feature, a highlight bar 650 may be configured to identify (e.g., using color coding, line thickness, etc.) portions of the source text for which the reading assistant tool has generated at least one summary.

In some cases, as described above, the reading assistant tool can automatically generate one or more summaries based on loaded source text without additional input from a user. In other cases, however, the reading assistant tool may provide a guided summarization feature with which the user may guide the summaries generated by the reading assistant tool through supplemental input provided to the reading assistant tool. For example, after (or in some cases before) the reading assistant tool automatically generates one or more summaries based on loaded source text, a user may provide supplemental text input to the reading assistant tool (e.g., via a text input window). The reading assistant tool can update generated text summaries (or generate new text summaries) based on the text input provided by the user.

The text input provided by a user can be free text input. The text input, for example, can specify a subject or theme of interest; identify, indicate, or reference, among other things: entities (e.g a particular person, organization, event, process, task), entity types (e.g. 'organizations', 'managers', 'meetings', 'requests'), topics (e.g. 'finance', 'sales', 'people'), or concepts (e.g. 'positive,' 'good,' 'happy,' etc.). In response to receiving the free text input from the user, the reading assistant tool can generate one or more summaries based on the loaded source text as well as the text input received from the user. The reading assistant tool can further highlight instances in one or more loaded source documents related to the free text entered by the user. The reading assistant tool can also select information from the loaded source text that pertains to the subject or theme, etc., of the user's text input even if none of the input text, or its morphological modifications, is found in verbatim in the text spans containing the information. The reading assistant tool can then include the selected information into one or more generated summaries, and the summaries can be organized based on the subject, theme, etc. conveyed by the user's input text.

FIG. 7 provides a block diagram representation of the process flow of the guided summarization feature of some embodiments of the disclosed reading assistant tool. At step 710, the reading assistant tool receives text input from the user. At step 720, the reading assistant tool analyzes the loaded source text documents and identifies sections of the source text relevant to the subject, theme, concept, etc. implicated by the user's text input. At step 730, the reading assistant tool generates one or more summaries based on both the user's text input and the text of the source text documents. At step 740, the reading assistant tool shows to the user (e.g., through an interface window on a display) the locations in the source text documents of text sections relevant to the user's input. The reading assistant tool also shows to the user the summaries generated based on the source text and the user's text input.

FIG. 8 illustrates an example of the guided summarization functionality of embodiments of the disclosed reading assistant tool. For example, interface window 810 shows an output of the reading assistant tool before receiving text input from the user, and interface window 820 shows an output of the reading assistant tool after receiving text input from the user. Specifically, as shown in the example of FIG. 8, the interface of the reading assistant tool may include a user text entry field 830. As shown in interface window 810, user text entry field 830 is blank and only includes the reading assistant tool's prompt, "Summarize according to . . . ". With no user text input to guide the summarization function, the reading assistant tool analyzes the loaded source text documents and generates summaries 850. In this case, two summary snippets are shown, and scroll bar 851 shows a current location relative to the source text document and locations of all summaries generated relative to the source text document. The two currently displayed summaries 850, generated without text input from the user, read:

"In qualifying plans with high deductibles, individuals can contribute pre-tax money to a Health Savings Account. As deductibles rise, more plans are becoming eligible for HSAs."

"Unspent money can be invested in the account and earn interest. HSA deposits are estimated to reach $75B in 2020."

Interface window 820 represents how the reading assistant tool can rely upon user text input to guide the summaries generated relative to the source text document. For example, as shown in user text entry window 830', the user has entered the phrase, "Health expenses." In response, and based on the user's text input, the reading assistant tool generates new summaries (e.g., updated summaries) relative to the source document text. For example, relative to the same section of the source text document shown in both windows 810 and 820, the reading assistant tool, in response to receiving the user text input, has generated a new summary 860. Not only is there one less summary relative to the same text passage, but the summary 860 differs from the summaries 850. Specifically, summary 860 reads:

"Health Savings Accounts allow contributing pre-tax money to a health expenses account."

Notably, the newly generated summary 860 conveys a meaning similar to a portion of the first of summaries 850, but summary 860 more prominently features the subject "health expenses" of the user's entered text. In addition, the reading assistant tool has linked the concept "health expenses" with "HSAs" and has referred to HSAs as "health expenses accounts" rather than "health savings accounts," to which the HSA acronym refers. Of course, a primary use for an HSA is to cover health expenses, which is the relationship gleaned by the reading assistant tool based on its training and/or its analysis of the source text documents. This connection provides one example of the reading assistant tool's capability for linking subjects, entities, concepts, etc. even where there is not a literal textual link for the connection.

As shown in FIG. 8, the reading assistant tool can also identify to the user the locations of summaries, relative to the source document text, that are particularly relevant to the user's entered text. For example, in the example represented in FIG. 8, the reading assistant tool has added in interface window 820 highlighted tick marks 870 to indicate where, relative to the source text, the reading assistant tool generated summaries relevant to the user's entered text, "Health expenses." And, as shown in window 830', the current location of scroll bar 851' is shown as overlapping with one highlighted summary (i.e., the location relative to the source text of generated summary 860).

FIG. 9 illustrates an example of another feature of some embodiments of the reading assistant tool. Specifically, in some cases, the reading assistant tool may be equipped with the ability to assist the user in drafting text by analyzing user-entered text and then suggesting supplements to the entered text, providing text re-write suggestions, etc. As the basis for the supplement and/or re-write suggestions, the reading assistant tool can draw upon facts, information, concepts, etc. referenced in one or more source text documents loaded into the reading assistant tool. The reading assistant tool can also draw upon facts, information, concepts, etc. referenced in one or more external databases as the basis for the supplement and/or re-write suggestions.

The reading assistant tool offers an integrated flow for composing a written document while a user interacts with the reading assistant. For example, as shown in FIG. 9, the reading assistant tool may include an interface window 910, which includes a source text review panel 920, a summary review panel 940, and a text composition panel 950. As an aside, the panels of interface window 910 may all be re-sized by the user depending on which section the user is most interested, in which section the user is currently working, etc. Text review panel 920 and summary review panel 940 can operate similarly to text review panel and summary review panel described relative to FIG. 8. For example, based on analysis of the loaded source text document, represented in text review panel 920, the reading assistant tool can generate one or more summaries, such as summary snippet 980, based on the source text and based on any entered user input text (optionally entered via user text entry field 982).

In the example of FIG. 9, text composition window 950 may be used by the user as a text editor to draft document text. In some cases, the user can copy and paste into text composition window 950 text obtained from text review panel 920 and/or from summary review panel 940. In addition, the user can also introduce free text edits into text composition window 950. As the user enters free text, the reading assistant tool can analyze the user's entered text and, similar to the functionality of the reading assistant tool described herein, can provide suggestions to the user for re-writing portions of user-entered text or for supplementing the user-entered text. The reading assistant tool's suggestions are based on both the text entered by the user and also on the loaded document source text and/or summary text generated by the reading assistant tool.

FIG. 9 represents an example of this functionality. Specifically, in text composition window 950, the user has entered text 960. Text 960 may include sections copy and pasted from text review panel 920 and/or from summary review panel 940. Text 960 may also include free text entered by the user. In this example, as the user was composing the last sentence shown in text passage 960, the reading assistant tool offered suggestion 970 for completing the sentence. That is, the user had entered the phrase, "The percentage of workers with HSAs increased," and in response, the reading assistant tool suggested the phrase, "by 280% in the past decade" to complete the sentence. The reading assistant's suggestion was based on concepts conveyed in both the user's entered text and in the source document text or summary text. For example, entry of the phrase "The percentage of workers with HSAs increased" prompted the reading assistant tool to refer to the facts, entities, relationships, etc. established for the source text document based on the analysis of that document to determine if the source document or relevant summaries contained any information relating to the percentage of workers with HSAs. Based on the user's entered text and its prior analysis of the source text document and generation of corresponding summaries, the reading assistant tool identified the fact that 23% of workers in 2019 had an HSA, compared to just 6% in 2009, which equates to a 280% increase. Thus, the reading assistant's suggestion for completing the user's sentence was drawn from facts and context conveyed by the user's text, as well as facts and context associated with the source document text/relevant summary. Notably, however, the text suggestion offered by the reading assistant tool was not framed in terms of the underlying percentages of workers with HSAs data, as included in the source text/summary. Rather, because the user's text referenced an "increase," the reading assistant tool was able to link the concept of an "increase" to an increase amount (i.e., 280%) in the underlying percentages between 2009 and 2019. The reading assistant tool was also able to link a difference in years (i.e., 2009 to 2019) to the concept of a "decade" and a comparison of a current time (e.g., 2020) to the years identified in the source text/summary to determine that 2009 to 2019 represents the decade before the current year. In view of these links and determined relationships, the reading assistant tool expressed the suggested sentence ending not in the literal facts/text appearing in the source text/summary, but rather in terms of a more complex concept, "in the past decade," which accurately, but differently, conveys the meaning/information included in the source text/summary.

To assist the user, the reading assistant tool can identify the source text or summary text serving as the basis for suggested re-write options or suggested text supplements. In the example of FIG. 9, suggestion 970 includes highlighting to identify the generated suggestion to the user. The reading assistant tool can also display the text from one or more summary snippets, such as snippet 980 (or text from the source document) on which the suggestion was based. In the example of FIG. 9, suggestion 970 is shown in proximity to snippet 980 (and optionally associated text from the source document) to identify to the user the information used as the basis for suggesting the phrase, "by 280% in the past decade."

The reading assistant tool can also offer the user the option to select a box 990 to automatically link the text suggestion to the source text or texts from which it was derived (an auto-citation function). The text suggestions offered by the reading assistant tool may include facts, direct quotes, paraphrased information, summarized information, etc. derived from the loaded source text documents and/or derived from externally one or more accessible documents or knowledge bases (e.g., via the Internet). The reading assistant's text completion and generation suggestions can also be modulated according to a currently active page of the source document, based on currently active summaries (e.g., those source document pages and summaries currently shown in an interface window associated with the reading assistant tool), or based on current text selections from the source document made by the user.

As noted above, the disclosed systems may determine a spread score for a set of potential summary snippets and may rely upon the determined spread scores and/or associated spread score rankings to determine which summary snippets to make available/show to the user via a display. For example, the ranking is generated by first calculating a spread score for each potential summary snippet, which reflects the degree to which the information contained in a particular summary snippet is spread throughout the source text. Using the spread scores, the generated snippets may be ranked (e.g., with a number indicating the relative ranking among summary snippets, etc.).

The spread scores are calculated by splitting the source text and the summary snippets into tokens. All stop-words may then be removed, keeping only meaningful tokens in their lemmatized form. The tokens of the summary snippets are then aligned with the tokens of the source text by looking for the longest common sequence of text between the two token lists, removing the tokens in that sequence from both lists and then repeating the process until no more common tokens remain. Spread scores are then calculated for the selected tokens in the list of tokens of the source text. While various calculations may be employed, in one example, the spread score for selected tokens in a text's token list may be calculated according to the following: Let $f(x)$ be a concave function (e.g., square root). For each pair of tokens, let p1, p2 be their indices in the text's tokens list. Then, sum $f(|p2-p1|)$ over all pairs. This calculation gives higher results to the tokens that are far from each other in the text, thus prioritizing summaries with higher spread over the text.

In some cases, the spread scores are associated with an appearance frequency in the source text of information included in the summary snippets. As indicated by the calculation above, however, the spread scores can also be indicative of how much of the source text or information included in the source text is related to information included in a particular summary snippet.

While in some cases the spread scores and associated rankings may be used solely behind the scenes to determine which summary snippets to make available to a user (e.g., those most relevant to the source text, etc.), in other cases, the spread scores and/or the associated spread score rankings may be made visible to the user. The spread score and/or spread score ranking may be useful to users in determining the degree of relevancy of a particular summary snippet to the source text to which it relates.

FIG. 10 provides one example of a user interface including the described spread scores and ranking. In this example, two summary snippets 1020 and 1030 have been generated based on the input text, and the "Summary ranking" header 1010 may be used to indicate that the summary snippets shown are organized by spread score ranking. Each summary snippet may be shown together with a generated spread score (e.g., score 1022) and an associated ranking 1021. As noted, the spread score may indicate to the user how strongly the generated summary snippet relates to the input text, and the associated rankings based on the generated spread scores may allow a user to quickly ascertain the information most pertinent to the input text.

The reading assistant tool may also offer other functions. In some cases, the reading assistant tool can provide summaries relative to non-text objects included in text documents. For example, the reading assistant tool can summarize objects such as charts, graphs and tables that may appear in text-based documents. The summaries of such objects may be prepared based on analysis and summarization of text determined by the reading assistant tool to be associated with or directly describing the non-text objects. Such text may appear, for example, in the body of text documents containing non-text objects; in legends of non-text objects such as graphs, charts, etc.; in axis labels of graphs, tables, etc. Additionally, information used in generated summaries of non-text objects may also be derived using object recognition technology.

The reading assistant tool can also provide a document segmentation feature (e.g., document chunking). For example, the reading assistant tool can split a document into subsections of various lengths, based on (a) the formatting and layout of the document; and/or (b) the semantic structure and discourse of the content. Given a target length, the system can determine splitting positions that will generate the coherent chunks of text. The system operates on written documents of various types, including, but not limited to, PDF files, MS Office documents, online articles in HTML format, among various others. The chunking functionality can result in summary snippets corresponding to meaningfully split subsections of documents.

For example, after at least one document is loaded into the disclosed reading assistant tool, the text of the document(s) may be segmented into two or more segments. The segments can be used as guides in generation of the summary snippets. For example, in some cases, a summary snippet may be generated for each segment or may be generated for two or more segments (e.g., where the segments are logically related). In some examples, the disclosed reading assistant may refrain from generating a summary snippet that spans multiple segments, but relates to less than all of the spanned segments. Such segmenting may assist in avoiding generation of summaries that are disjointed, incomplete, repetitive, etc.

The segmenting may be based on various characteristics of the source documents. In some embodiments, for example, the segmenting may be based on formatting associated with the at least one source text document. Formatting may include any document characteristics that affect the appearance of a source text document and/or relate to how the elements of the document (e.g., text, figures, graphics, etc.) are arranged relative to one another. Formatting may include characteristics, such as, the presence of carriage returns, blank lines, page breaks, text boxes, images, figures, etc. Formatting may also include the arrangement of text into columns, etc. Formatting may also refer to the programmed format of a text document. For example, in an HTML document, tags may be used to designate certain formatting features (e.g., <b> for bold, <h1> for header, etc.). Such tags can be relied upon for determining how a particular text should be segmented. One or more computer vision models may be employed to identify formatting features useful for text segmentation.

Additionally or alternatively, the segmenting may be based on semantic context of the input/source text. For example, the disclosed reading assistant system may analyze the context of the input text and determine potential text segments based on changes in subject, context, etc. Where the input text moves from one subject or topic to another, such a change can be flagged or otherwise identified as a location in the text of a text segment boundary. Such changes can be identified within a single paragraph (e.g., where one paragraph spans two or more different subjects, topics, concepts, etc.), between paragraphs, or after multiple paragraphs. In other words, a text segment identified based on context of the input/source text may constitute less than a full paragraph, one full paragraph, multiple paragraphs, or a combination of portions from two or more paragraphs.

Segmentation based on context may be used in conjunction with segmentation based on formatting to refine identified document segments. For example, various formatting features (e.g., page breaks, carriage returns, blank lines, figure placement, etc.) may be used to determine initial document segments. In some cases, such formatting features may delineate document segments. In many cases, however, the text before and after such formatting features may be linked contextually. In such cases, segmenting the input text based on formatting features alone may result in disjointed or repetitive summary snippets. In these cases, e.g., where the text before and after certain formatting features relates to a common topic, subject, concept, etc., the disclosed reading assistant system may group the text before and after such formatting features together in a common text segment.

FIG. 11 provides one example of how the disclosed text segmentation techniques may be employed in generating the described summary snippets. As shown in FIG. 11, an input text is reproduced in window 1102. In this example, the input text includes four paragraphs 1104, 1106, 1108, and 1110. The input text also includes several formatting features that may be used in segmentation of the input text. For example, the input text includes a blank line 1112 between paragraphs 1104 and 1106; a blank line 1113 between paragraphs 1106 and 1108; a page break 1114 within paragraph 1108; a graphic 1116 within paragraph 1106; and a graphic 1118 between paragraphs 1108 and 1110.

In the example of FIG. 11, an initial segmentation process based on formatting characteristics alone may suggest six different text segments to summarize—one on each side of formatting features 1112, 1113, 1114, 1116, and 1118. When the context of the input text is analyzed, however, the reading assistant system may determine that the input text should be segmented into fewer than six segments. For example, based on the context analysis, the reading assistant system may determine that the text before and after graphic 1116 relates to early bicycle drive mechanics. In such a case, the reading assistant system may include all of paragraph 1106 in a single document segment regardless of the presence of graphic 1116 within the text of paragraph 1106. Similarly, based on context analysis of the input text, the reading assistant system may determine that the text before and after page break 1114 relates to modern bicycle drive mechanics. As a result, the reading assistant system may include all of paragraph 1108 in a single document segment regardless of the presence of page break 1114 within the text of paragraph 1108.

Graphic 1118 separates the text of paragraph 1108 from the text of paragraph 1110. In this case, paragraph 1108 relates to modern bicycle drive mechanics, and paragraph 1110 relates to a different subject-bicycle tires. In view of these different subjects, the reading assistant system may rely upon the formatting feature of graphic 1118 to include paragraph 1108 in a text segment different from a text segment in which paragraph 1110 is included.

While not represented in the example of FIG. 11, where text on either side of a formatting feature relates to a common subject, the text before and the text after the formatting feature may be included together in a common text segment. Referring to the example of FIG. 11, if paragraphs 1108 and 1110 both related to modern bicycle drive mechanics, the reading assistant system may have included both of paragraphs 1108 and 1110 together in a common text segment for summarization.

It should be noted that text segments need not track separations between paragraphs of an input text. For example, in some cases, the reading assistant system may identify a text segment as constituting only a portion of a paragraph, rather than the whole paragraph (e.g., the first two sentences of paragraph 1104). In other cases, an identified text segment may constitute portions of two different paragraphs (e.g., the last sentence of paragraph 1104 and the first two sentences of paragraph 1106). In still other cases, because of determined contextual relationships between text, for example, an identified text segment may constitute portions of two different and spaced apart paragraphs (e.g., the first two sentences of paragraph 1106 and the last two sentences of paragraph 1110).

Once the input text has been segmented, the reading assistant system may generate at least one summary snippet for each of the text segments. The at least one summary snippet conveys a meaning associated with one or more portions of the input text (e.g., one or more corresponding text segments), but includes one or more textual differences relative to the one or more portions of the input text. In the example of FIG. 11, the generated summary snippets are shown in a summary window 1120 of a user interface shown on a display. And based on text segments identified based on formatting characteristics and contextual differences within the input text, the reading assistant system has generated four summary snippets 1122, 1124, 1126, and 1128 corresponding to each of the text segments.

Based on the described techniques, the system will group raw text from one or more source files into sentences, paragraphs and sections by both taking the visual representation, as obtained with one or more computer vision models, and the textual context, as it is obtained using language models. In this way, the system can fuse both visual information of a document's layout and contextual information of the document content to analyze, extract, and segment text from a particular source document or documents. The system can work with various types of files, including PDF files, Word files, or any other text-based file type. By combining contextual and visual analyses, the described systems may overcome various challenges, such as connecting consecutive paragraphs that are visually separated in the original file (e.g., by a page break or image), handling text arranged in multi-column layouts, etc.

Audio and Video Summarizer

The disclosed reading assistant systems may also include additional functionality. For example, the disclosed systems may be configured to provide summaries of information included in audio and/or video files with audio. The disclosed audio and video transcriber and summarizer systems may receive source audio or video with audio files as input and generate corresponding summaries (e.g., text-based summaries, audio summaries, etc.) based on the received input files.

Such functionality has the potential to significantly improve the efficiency with which information included in audio and/or video files is consumed. For example, it can be time-consuming to watch or listen to audio/video sources such as recorded lectures or podcasts. For visual learners, it can be difficult to fully consume and retain information based on a single watch/listen of an audio/video file. Further, those with hearing impairments may have difficulty receiving audio information from video or audio files. Audio-only files can be especially difficult to process, as those with hearing impairments cannot rely on the presence of visual cues to assist with understanding the audio.

The disclosed summarizer systems are aimed at addressing these and other issues associated with the consumption of information contained in audio and or video with audio files. For example, based on received input audio or video with audio files, the disclosed summarizer systems can transcribe the audio elements and generate concise summaries based on the transcription. The concise summaries are intended to enable more expeditious consumption of information (and in some cases, a better understanding of information) included in audio or video with audio files.

The disclosed audio and video transcriber and summarizer tool may also include a user interface including multiple features to facilitate user interaction with audio/video files and the summaries generated based on those files. For example, the audio and video transcriber and summarizer tool may include windows that provide side-by-side views of audio/video file representations (e.g., images, icons, generated text transcriptions, etc.) and corresponding generated summaries. User-initiated navigation relative to the summaries may result in automatic, corresponding navigation relative to the audio/video files, and vice versa. To facilitate user interaction with the source audio/video files and the associated summaries generated by the disclosed summarizer systems, the user interface may include a variety of interactive virtual buttons, text entry and display windows, text entry fields, etc. that a user may engage with in order to take advantage of any of the described features or functionality of the audio and video transcriber and summarizer tool. The disclosed audio and video transcriber and summarizer tool can be used on various types of client devices and together with various different operating systems and applications.

FIG. 12 represents an example operation flow associated with an audio and video transcriber and summarizer tool according to exemplary disclosed embodiments. For example, step 1210 includes acquiring an audio or video with audio file on which the audio and video transcriber and summarizer is to operate. The files may be acquired from various different sources loaded or identified through an interface of the audio and video transcriber and summarizer tool. Any of the document identification techniques described above relative to the reading assistant can be used to identify audio/video files to be summarized. The audio and video transcriber and summarizer tool may allow an input audio or video with audio file to be identified with a web address or file identifier. The file identifier may be generated by dragging and dropping the source audio or video with audio file into a user interface window of the tool. The file identifier may be associated with a database directory or with an Internet location. Input files accepted by the audio and video transcriber and summarizer can also include podcasts, recorded lectures, recorded speeches, and recorded newscasts. More than one source audio or video with audio file can be inputted into the tool. More specifically, among others techniques, audio/video files can be identified by dragging and dropping a file into an interface window, through use of a file hyperlink or URL, by selection from a drop down menu (e.g., "file—open"), or using any other suitable file identification technique.

In addition to the file identification techniques described above, other techniques may also be used to initiate operation of the disclosed audio/video summarizer tool relative to a particular audio/video file. For example, in some cases, the audio/video summarizer tool may be added as an extension to another application (e.g., an audio/video editor, a web browser, etc.). In such cases, the extended application may recognize when a user has identified an audio/video file or has navigated to a site (e.g., a web location) where an audio/video file is located, and in such cases, a user interface associated with the extended application may generate a UI element (e.g., a virtual button, etc.) that the user can select to initiate summarization of the identified/available audio/video file.

Next, at step 1220, the audio and video transcriber and summarizer tool may transcribe the audio components of the input audio or video with audio file. Based on the transcription, a raw transcript may be generated at step 1230. Any suitable technique may be used for transcribing speech included in the audio tracks of an audio/video file. In some cases, speech-to-text technology may be incorporated into the summarizer system to generate the initial audio transcription. Such speech-to-text technology allows the audio and video transcriber and summarizer tool to detect speech represented by an audio track and convert the speech from audio form into a digital text representation. In some cases, the speech-to-text functionality may involve natural language processing methods and the use of trained networks to translate spoken language into digital text.

At step 1240, the audio and video transcriber and summarizer may operate on the raw transcript. Using one or more trained language models the disclosed summarizer system may edit the raw transcript to create a formatted transcript at step 1250. As raw automatic transcripts may be prone to errors and transcription mistakes, the system first corrects the input text and transforms it into a well-structured text. This editing of the raw transcript may involve various potential changes to the raw transcript. Such changes may include adding punctuation, changing capitalization, arranging the text into sentences and paragraphs in some cases, adding blank lines (e.g., to delineate different speakers, etc.), among other types of text revisions.

The transcript may then be segmented or further segmented. One or more algorithms may analyze metadata associated with the audio/video file to provide segmentation. For example, in the formatted transcript, the arrangement of text into sentences or paragraphs can be based on audio events detected relative to an audio track of an audio/video file (e.g., a change in speaker, a change in topic, etc.). Such events can be associated with timestamps associated with the audio/video file, which can assist in correlating the formatted transcript (or generated summaries), for example, with corresponding sections of the audio/video file.

The arrangement of text into sentences or paragraphs can also be based on visual events detected relative to a video file. For example, detected changes in video shot from one person/subject to another, changes in scene, etc. may be used as cues for arranging text associated with the formatted transcript generated at step 1250. The arrangement of text into sentences or paragraphs can also be based on the timeline associated with an audio/video file, based on metadata associated audio/video file, etc.

One or more trained models may be used to further segment the formatted transcript into final sentences, paragraphs, and/or sections. Such segmentation may involve any of the document segmentation techniques described in the sections above.

Next, at an optional step 1260, in preparation for generating summaries (or as part of generation of the summaries), the audio and video transcriber and summarizer tool may analyze and enrich information associated with the formatted transcript. For example, using one or more trained language models, trained neural networks, etc., the audio and video transcriber and summarizer tool may analyze the formatted transcript and perform one or more of the following actions based on to the formatted transcript: identify and/or recognize entities described in the acquired text (even those identified by pronouns); summarize facts, information, argument, points, etc. associated with the formatted text; draw on external knowledge sources (e.g., databases, documents, etc. available via the Internet or other sources) to augment information etc. conveyed by the formatted text (e.g., to fact check, to confirm gender of a particular subject, to identify conflicting statements made by a subject, etc.); identify relationships between various types of entities referenced in the formatted text; and identify and/or extract keywords and key concepts from the formatted text; among other tasks. Such a trained language model may include one or more trained language models developed by AI21 Labs (among other available trained language models).

The disclosed audio/video file summarizer tool may include one or more user interfaces configured to aid a user in consuming information included in the audio/video file (e.g., as represented by the formatted transcript generated at step 1250 and/or the augmented and enriched information developed at step 1260). For example, based on the formatted transcript and/or the analysis of step 1260, the audio and video transcriber and summarizer tool can generate various types of user interface-based outputs at step 1270 to assist a user in working with/understanding the acquired audio or video with audio file. For examples the audio and video transcriber and summarizer tool can generate summary snippets based on segments of the formatted transcript. The summary snippets may convey key information or points associated with segments of the formatted transcript, while including one or mode modifications to those segments. The modifications may include changing words, omitting words, substituting words, simplifying language complexity, removing phrases, adding word or phrases etc. The summary snippets may be generated based on any of the document summarizing techniques described in the sections above.

User interfaces generated as part of step 1270 may offer a semantic search capability and/or query-oriented summaries. For example, a user can enter text into an input field (e.g., a query box, etc.), and the audio and video transcriber and summarizer tool can find words and phrases in the formatted transcript that correlate with the contextual meaning of the input text. In other cases, based on the input text provided by the user, the audio and video transcriber and summarizer tool can generate or update one or more summary snippets to emphasize certain semantic meanings, entities, relationships, facts, arguments, etc. that relate to the input text and that are conveyed by the formatted transcript to which the summary snippets relate.

The system may also include a feature that enables a user to skim an audio or a video file, in a manner similar to how a textual document would be skimmed. For example, user interfaces generated as part of step 1270 may provide various views to facilitate user consumption of information included in an audio/video file. The audio and video transcriber and summarizer tool may enable the user to view the generated summary snippets (e.g., one or more of the summary snippets may be shown in a first window) together with a representation of the input audio or video with audio file (e.g., an icon, title, image frame, transcript or transcript section, etc. shown in a second window). In this way, the system displays textual summaries for the input audio or video, each linked to a specific part of the original audio or video. By clicking on a specific part of the summary, the user will be directed to the relevant part of the audio or video. Thus, the user can read through the summarization and then jump to the relevant part of the video or audio to watch or hear it in full.

FIG. 13 provides an example of a representation of a video file displayed together with corresponding summary snippets generated by the disclosed summarizer system. For example, in a first user interface window 1310, a video window 1315 shows a representation of a video file entitled "Why humans run the world." In this case, the video file representation includes an image frame featuring a speaker that appears on the video together with an interesting quote associated with the audio track of the video file.

The user interface may also include a second user interface window 1320 configured to display generated summary snippets along with other information. It should be noted that the orientations of the user interface windows and the content included in each can be varied. In the example of FIG. 13, user interface window 1320 includes several summary snippets, including summary snippets 1321 and 1322, generated based on transcribed text corresponding to the audio portion of the video file. Each summary snippet is associated with a timestamp 1330 associated with the video represented in window 1315. The timestamp may be used as an indicator of a location in the source video file of audio used to generate a particular summary snippet. The timestamp, for example, may be used as a guide for the user to navigate to a particular location in the video file to play a portion of the video file particular relevant to a particular summary snippet of interest to the user. The |I|I icon to the right of the timestamp in summary snippet 1321 indicates that the portion of the video file relevant to snippet 1321 (e.g., content of the video file used to generate summary snippet 1321) is currently playing in window 1315. Selection of any snippet inside the user interface (e.g., by clicking on a particular snippet) may prompt the replay of the video file in window 1315 from the point indicated by the corresponding timestamp of the snippet.

Other features may be included in the system-generated user interface. For example, above the summary snippets included in window 1320, there is a window 1340 that includes a title of the relevant video file and the name of a presenter featured on the video. Window 1340 also indicates how many summary snippets have been generated based on the video (i.e., 16) and how many minutes (i.e., 2) the generated snippets may require to consume. Rather than having to watch the entire video file, a user may consume the important points of the video by skimming the summary snippets and/or by watching the parts of the video corresponding to the summary snippets.

Additional guides for the user may also be provided via the generated user interface. For example, in some cases, the system can augment an audio or video player timeline with time-bounded textual information that helps the user to navigate and consume the audio or video. For example, the disclosed audio/video summarizer may segment the original audio or video into content-aware sections and display on the timeline associated with the audio/video file information that may include, among other things: key topics in the section, summarization of the section, a relevant title for the section, or a description of the section. Using this visual aid, the user can navigate the audio or video, quickly and efficiently jumping to portions of interest.

Returning to step 1270, the user interface generated by the disclosed system may also offer the ability to view the formatted transcript of an input audio or video with audio file at the same time as its associated summary snippets. FIG. 14 provides an example of a user interface of the audio and video transcriber and summarizer tool displaying a formatted transcript side-by-side with associated summary snippets generated by the system. Here, the formatted transcript constitutes a representation of the input audio/video file shown on the display together with the generated summary snippets.

The user interface may include various features and control elements allowing a user to efficiently navigate through the summaries and/or portions of interest of the source audio/video file. In this example, the generated summary snippets (e.g., snippet 1431) are shown in a window 1430, while a transcript of the source video file is shown in window 1440. Should the user wish to interact with the source audio/video file rather than to view the transcript, however, the user can click on a control element 1410, which causes the video/audio player window 1315 to reappear (e.g., in place of transcript window 1440).

Referring to features included in the particular example of FIG. 14, a transcript window 1440 may be identified by a title block 1421 including the title, filename, etc. associated with the source audio/video file. The formatted transcript, or portions thereof, may be shown in window 1440 below title block 1421. In this example, paragraphs of the transcript are associated with timestamps 1422 indicating where along the virtual timeline of the video file audio corresponding to the transcript paragraph may be located.

The user interface may include a link indicator 1423 in the formatted transcript to identify sentences and/or phrases of the transcript associated with one or more generated summary snippets, such as snippet 1431. Selection of a link indicator (e.g., by clicking on the region within the link indicator) will cause the summary snippet related to that particular section of the formatted transcript to be displayed.

In this example, the summary snippets in window 1430 are arranged in a bullet point list. Any other suitable arrangement or format for the summary snippets, however, may also be used. Above the list of summary snippets is a tab 1432 entitled 'Summary.' Selection of tab 1432 causes the list of summary snippets 1430 to be displayed. Next to tab 1432 is another tab 1440 entitled 'Notes.' Selection of tab 1440 causes notes associated with the formatted transcript (e.g., notes that a user may generate and enter via the user interface, etc.) to be displayed in lieu of or in addition to the list of summary snippets 1430. The user interface in the FIG. 14 example also includes a search bar 1450 which allows a user to perform a semantic search. For example, the semantic search may allow a user to find words and phrases in the formatted transcript that correlate with the contextual meaning of the text inputted into the search bar.

The user interface may also include controls for navigating relative to the generated summary snippets and/or the corresponding transcript or source audio/video file. For example, the user interface may include a first scroll bar associated with the summary snippets and a second scroll bar associated with the formatted transcript. These scroll bars may enable vertical navigation (e.g., scrolling) relative to the snippets and/or transcript. In some embodiments, the navigation of the snippets and transcript may be linked such that changing the position of the first scroll bar to move locations of summary snippets in window 1430 will cause movement of the transcript in window 1440. For example, if a change in position of the first scroll bar results in removal of a snippet from window 1430, a section of transcript corresponding to the removed snippet may also be removed from window 1440. Similarly, if a change in position of the first scroll bar results in the appearance of a new snippet (or portion of a new snippet) into window 1430, a section of transcript corresponding to the new snippet may also be added/shown in window 1440.

Inverse navigation of the snippets/transcript is also possible. For example, if a change in position of the second scroll bar results in removal of a transcript section from window 1440, one or more snippets corresponding to the removed transcript section may also be removed from window 1430. Similarly, if a change in position of the second scroll bar results in addition of a new transcript section into window 1440, one or more snippets corresponding to the new transcript section may also be included/shown in window 1430. Such navigational capabilities may allow a user to quickly navigate through summary snippets, while having access to corresponding transcript sections should more information be desired. Similarly, a user can skim through a transcript of an audio/video file and quickly review any summary snippets that were generated by the system based on the transcript sections shown on the user interface.

Similar navigation capabilities may also be provided relative to the summary snippets and the source audio/video files. For example, in the user interface example shown in FIG. 13, the user interface may include scroll bars (e.g., a vertical scroll bar for the summary snippets and a horizontal timeline scroll bar for the source video file) to enable a user to navigate relative to the source audio/video file and the generated summary snippets. In such a case, a change in position of the source file scroll bar initiates traversing of the virtual timeline (in a direction corresponding to the change in position of the source file scroll bar) of the displayed source audio/video file. In addition to changing a position along the source file timeline, changing a position of the source file scroll bar may also cause a change in the summary snippets displayed in window 1320. For example, summary snippets generated based on a certain time range of the audio track associated with the source audio/video file may be displayed in window 1320. As the audio track time range is changed (e.g., by shifting the source file scroll bar left or right), the list of summary snippets will change accordingly.

Navigation through the summary snippets shown in window 1320 (e.g., using a vertical scroll bar) may also cause corresponding changes in the representation of the source audio/video file shown in window 1310. For example, moving the summary snippet scroll bar may cause a new set of snippets to be shown in window 1320. In response, a timeline indicator associated with the source audio/video file may be changed such that one or more timestamp ranges of the source audio/video file corresponding to the new set of snippets may be shown in relation to window 1310. Clicking on any summary snippet may cause replay of one or more sections of audio/video used to generate the selected summary snippet.

Returning to FIG. 12, the disclosed audio/video summarizer system may also be configured to generate new audio or video with audio based on the operation of the summarizer. For example, in response to user input, the system may automatically generate a short audio or video version of the original source audio/video file, based on the summarization of the content included in the source audio/video file. For example, the disclosed audio/video summarizer system may transform the audio or video into text and generated summary snippets based on the techniques discussed above. The audio/video summarizer system may then generate an edited version of the original audio/video source file based on the generated summaries. The edited version of the original audio/video file may include only the portions relevant to the generation of the summaries. Other sections of the source audio/video file not featured/represented in the generated summaries may be omitted from the edited audio/video file. The edited file output may represent a shorter version of the original source audio/video file that a user may consume more quickly than the original (e.g., allowing efficient consumption of the main points of the original source file).

Additional features may be incorporated into the short audio/video file generated based on the summaries. For example, various audio/video transitions (e.g., fade in, fade out, hard cuts, etc.) may be included in locations where sections of the source audio/video are omitted as part of the summarization process. In some embodiments, such locations may be filled with a video transition generated by one or more AI-based video generator tools.

The user can guide the operation of this feature. For example, the system can receive input from the user (e.g., identification in a text window of subjects of particular interest) and use that input to generate the summaries and the corresponding short form of the source audio/video file. This may allow a user to create a short audio/video file that recaps only certain topics or subject mentioned in the original source audio/video (e.g., focusing only on information relating to a specific person, focusing only on information conveyed by a particular speaker, etc.).

As noted above, the audio and video transcriber and summarizer tool may display an indicator of a link between a summary snippet and at least one corresponding location of a source audio/video file or a generated transcript of the source audio/video file. Selection of this indicator (by clicking on the indicator) may initiate playback of a section of the source audio/video file, display of a certain portion of the generated transcript, etc. In some cases, playback of the portion of the source audio/video file may begin at the timestamp where speech associated with a particular summary snippet first appears in the audio track of the source audio/video file. In some cases, however, playback from this timestamp location may not provide the user with a desired level of context. Therefore, in some cases, the audio and video transcriber and summarizer tool may allow for playback beginning from a timestamp corresponding to a predetermined amount of time prior to the start of the portion of the source audio or video with audio file on which a summary snippet is based. Such functionality may allow the user to gain additional context relative to a particular section of the audio track and/or generated summary snippet. The predetermined amount of time may be based on input received from a user (e.g., radio buttons, scrollable dial, text/number entry field etc. allowing a user to set a desired level of buffer audio to include).

The disclosed audio/video summarizer system may also include other features aimed at aiding users in consuming information included in audio/video files. For example, based on summary snippets generated according to the techniques described above, the disclosed systems may generate topic indicators. These topic indicators may be associated with a timeline for a source audio/video file. The topic indicators may include text included in or associated with the summary snippets. Inclusion of such topic indicators along a timeline associate with a source audio/video file may indicate what topics are referenced at various sections of the audio/video file. Using the topic indicators as a guide, a user may skim through the source audio/video file to get a high level summary of the information covered in the source audio/video file. Should any of the topics referenced by the topic indicators be of interest to the user, the user could click on a particular location of the source audio/video file timeline to cause playback from the selected timestamp. Such functionality may enable a user to gauge content without having to fully consume an entirety of a source file. It should be noted that such topic indicators may also be generated and included among a list of generated summary snippets (e.g., to provide high-level guidance regarding topics covered by the summary snippets). The topic indicators may also be associated with the generated transcript (e.g., the formatted transcript shown in window 1440). Additionally, topic indicators may be generated and associated with timelines of short versions of the source audio/video files.

The audio and video transcriber and summarizer tool may also allow for real-time transcription and summarization of audio fed into the tool via a user device microphone. For example, the disclosed audio and video transcriber and summarizer tool may receive audio of real-time speech acquired by a microphone (e.g., a microphone associated with a client device). Using the techniques described above, the disclosed system may transcribe the received speech into digital text and may commence with the summarization process during acquisition of the speech or after. Such a feature may be useful in scenarios such as meetings, court proceedings, interviews, etc. where large amounts of information may be generated. Of course, such meetings etc. may be recorded, but locating information within the recording file may be difficult. Further, summarizing information included in the recording may be time consuming and may require as much time or more than the length of the original recording. The disclosed audio and video transcriber and summarizer system may enable transcription and automatic summarization of key information covered in speech acquired in real time.

The systems and methods described above are presented in no particular order and can performed in any order and combination. For example, various embodiments of the document summarizer and/or the audio/video summarizer may include a combination of all of the features and functionality described above, or in some cases, the document summarizer and/or the audio/video summarizer may offer any subset of described features and/or functionality.

The above-described systems and method can be executed by computer program instructions that may also be stored in a computer readable medium (e.g., one or more hardware-based memory devices) that can direct a computer, other programmable data processing apparatus, or other devices to function in a particular manner, such that the instructions stored in the computer readable medium produce instructions which when implemented cause the reading assistant to perform the above-described methods.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the above-described methods.

It will be understood from the foregoing description that modifications and changes may be made in various embodiments of the present invention without departing from the invention described in this specification. The descriptions in this specification are for purposes of illustration only and are not to be construed in a limiting sense. The scope of the present invention is limited only by the language of the following claims.

What is claimed is:

1. A non-transitory computer readable medium including instructions that when executed by one or more processing devices cause the one or more processing devices to perform a method including:

receiving an identification of two or more source text documents;

loading text from the two or more source text documents;

receiving from a user a search query;

analyzing the search query received from the user;

generating, based on the analysis of the search query and based on information conveyed by the text from the two or more source text documents, a plurality of summary snippets associated with one or more portions of the text of the two or more source text documents, wherein the plurality of summary snippets summarize information found in the one or more portions of the text of the two or more source text documents that is also relevant to the search query; and causing the plurality of summary snippets to be shown on a display with the text of the two or more source text documents, wherein navigation relative to the text of the two or more source text documents initiates corresponding navigation of the generated summary snippets.

2. The non-transitory computer readable medium of claim 1, wherein the search query includes free text including one or more words.

3. The non-transitory computer readable medium of claim 1, wherein the search query includes an entity identification.

4. The non-transitory computer readable medium of claim 3, wherein the entity identification is used to generate an entity graph relative to the two or more source text documents, and wherein the entity graph is shown on the display.

5. The non-transitory computer readable medium of claim 1, wherein one or more of the plurality of summary snippets includes a link to source text included in at least one of the two or more source text documents.

6. The non-transitory computer readable medium of claim 1, wherein the plurality of summary snippets are generated based on analysis of text segments based on segmenting the two or more source text documents.

7. The non-transitory computer readable medium of claim 6, wherein the segmenting of the two or more source text documents is based on at least one of a target segment length, formatting of at least one of the two or more source text documents, or semantic context of text of at least one of the two or more source text documents.

8. The non-transitory computer readable medium of claim 1, wherein the navigation relative to the text of the two or more source text documents is enabled by at least one scroll bar.

9. The non-transitory computer readable medium of claim 1, wherein the method further includes:

generating a knowledge graph of entities referenced in at least one of the two or more source text documents; and causing a representation of the knowledge graph to be shown on the display.

10. The non-transitory computer readable medium of claim 1, wherein the method further includes ranking the plurality of summary snippets according to a degree to which information contained in the plurality of summary snippets is spread throughout at least one of the two or more source text documents.

11. The non-transitory computer readable medium of claim 1, wherein the two or more source text documents comprise at least one of a PDF document, online text document, WORD document, HTML document, or plain text document.

12. The non-transitory computer readable medium of claim 1, wherein the at least one of the two or more source text documents was acquired via the Internet.

13. A method for user search queries, comprising:

receiving an identification of two or more source text documents;

loading text from the two or more source text documents;

receiving from a user a search query;

analyzing the search query received from the user;

generating, based on the analysis of the search query and based on information conveyed by the text from the two or more source text documents, a plurality of summary snippets associated with one or more portions of the text of the two or more source text documents, wherein the plurality of summary snippets summarize information found in the one or more portions of the text of the two or more source text documents that is also relevant to the search query; and causing the plurality of summary snippets to be shown on a display with the text of the two or more source text documents, wherein navigation relative to the text of the two or more source text documents initiates corresponding navigation of the generated summary snippets.

14. The method of claim 13, wherein the plurality of summary snippets are generated based on analysis of text segments based on segmenting the two or more source text documents.

15. The method of claim 13, wherein the navigation relative to the text of the two or more source text documents is enabled by at least one scroll bar.

16. The method of claim 13, wherein the two or more source text documents comprise at least one of a PDF document, online text document, WORD document, HTML document, or plain text document.

17. A system for user search queries, the system comprising at least one processor comprising circuitry and a memory, wherein the memory includes instructions that when executed by the circuitry cause the at least one processor to:

receive an identification of two or more source text documents;

load text from the two or more source text documents;

receive from a user a search query;

analyze the search query received from the user;

generate, based on the analysis of the search query and based on information conveyed by the text from the two or more source text documents, a plurality of summary snippets associated with one or more portions of the text of the two or more source text documents, wherein the plurality of summary snippets summarize information found in the one or more portions of the text of the two or more source text documents that is also relevant to the search query; and cause the plurality of summary snippets to be shown on a display with the text of the two or more source text documents, wherein navigation relative to the text of the two or more source text documents initiates corresponding navigation of the generated summary snippets.

18. The system of claim 17, wherein the plurality of summary snippets are generated based on analysis of text segments based on segmenting the two or more source text documents.

19. The system of claim 17, wherein the navigation relative to the text of the two or more source text documents is enabled by at least one scroll bar.

20. The system of claim 17, wherein the two or more source text documents comprise at least one of a PDF document, online text document, WORD document, HTML document, or plain text document.

\* \* \* \* \*